(12) United States Patent
Hirsch et al.

(10) Patent No.: US 8,966,656 B2
(45) Date of Patent: Feb. 24, 2015

(54) DISPLAYING PRIVATE INFORMATION USING ALTERNATE FRAME SEQUENCING

(75) Inventors: Alexander Samson Hirsch, Highland Park, IL (US); Michael Joseph Deluca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/278,802

(22) Filed: Oct. 21, 2011

(65) Prior Publication Data

US 2013/0103943 A1  Apr. 25, 2013

(51) Int. Cl.
*G06F 7/04* (2006.01)
*G09C 5/00* (2006.01)
(Continued)

(52) U.S. Cl.
CPC *G09C 5/00* (2013.01); *G06F 21/84* (2013.01); *G09G 3/20* (2013.01); *G09G 5/14* (2013.01); *H04L 9/12* (2013.01); *H04L 9/3228* (2013.01); *G09G 2340/0442* (2013.01); *G09G 2340/14* (2013.01); *G09G 2354/00* (2013.01);
(Continued)

(58) Field of Classification Search
CPC .................................................... G06F 3/013
USPC ............................................................ 713/168
See application file for complete search history.

(56) References Cited

U.S. PATENT DOCUMENTS 5,488,496 A   1/1996 Pine
5,537,476 A   7/1996 Coteus et al.
(Continued)

FOREIGN PATENT DOCUMENTS

EP   1229422 A1   8/2002
EP   1760621 A1   3/2007
(Continued)

OTHER PUBLICATIONS

"Alternate-frame sequencing", [Online]. Retrieved from the Internet: <URL: http://en.wikipedia.org/wiki/Alternate-frame_sequencing>, (Accessed Feb. 11, 2013), 8 pgs.
(Continued)

*Primary Examiner* — Ashok Patel
*Assistant Examiner* — Gary Gracia
(74) *Attorney, Agent, or Firm* — Schwegman Lundberg & Woessner, P.A.

(57) ABSTRACT

Private information can be displayed using alternate frame sequencing to prevent unauthorized viewing. The private information can be ascertained by an authorized user using an active shutter viewing device synchronized to the alternate frame sequencing display. Private information can be displayed on a portion of the display, while public information, including a basic user interface, can be displayed on a second portion visible to authorized and unauthorized users. For enhanced security, alternate frame sequencing synchronization parameters can be encrypted and exchanged between a display device and the viewing device. When and where to display private information using alternate frame sequencing can be determined using environmental sensors. A single display screen can be configured to simultaneously present private information to multiple users, each user permitted to view a portion of the private information according to the unique synchronization parameters employed by a user's viewing device.

27 Claims, 22 Drawing Sheets

(51) Int. Cl.
*G06F 21/84* (2013.01)
*G09G 3/20* (2006.01)
*G09G 5/14* (2006.01)
*H04L 9/12* (2006.01)
*H04L 9/32* (2006.01)
*G06F 17/30* (2006.01)

(52) U.S. Cl.
CPC ........ *G09G2358/00* (2013.01); *G09G 2380/14* (2013.01); *H04L 2209/80* (2013.01)
USPC ...... 726/29; 726/4; 726/17; 726/28; 380/261; 713/168; 713/189

(56) References Cited

U.S. PATENT DOCUMENTS

| | | | |
|---|---|---|---|
| 5,614,920 | A | 3/1997 | Coteus et al. |
| 5,619,219 | A | 4/1997 | Coteus et al. |
| 5,629,984 | A | 5/1997 | McManis |
| 5,801,697 | A | 9/1998 | Parikh et al. |
| 5,963,371 | A | 10/1999 | Needham et al. |
| 6,349,001 | B1 | 2/2002 | Spitzer |
| 6,529,209 | B1 | 3/2003 | Dunn et al. |
| 6,980,177 | B2 | 12/2005 | Struyk |
| 7,319,755 | B2 | 1/2008 | Struyk |
| 7,457,415 | B2 | 11/2008 | Reitmeier et al. |
| 7,650,641 | B2 | 1/2010 | Veselova et al. |
| 2002/0101988 | A1* | 8/2002 | Jones .............................. 380/54 |
| 2003/0038838 | A1 | 2/2003 | Pollitt |
| 2003/0133569 | A1* | 7/2003 | Stern et al. .................... 380/206 |
| 2005/0212720 | A1 | 9/2005 | Rothman et al. |
| 2006/0078158 | A1 | 4/2006 | Liedenbaum et al. |
| 2006/0221067 | A1* | 10/2006 | Kim et al. ..................... 345/204 |
| 2007/0024698 | A1 | 2/2007 | Engstrom et al. |
| 2007/0247392 | A1* | 10/2007 | Littrell .............................. 345/8 |
| 2007/0296889 | A1 | 12/2007 | Struyk |
| 2008/0144967 | A1 | 6/2008 | Struyk |
| 2009/0055654 | A1* | 2/2009 | Dunn et al. .................... 713/182 |
| 2009/0141895 | A1* | 6/2009 | Anderson et al. ............. 380/252 |
| 2009/0165140 | A1* | 6/2009 | Robinson et al. ............... 726/26 |
| 2010/0012715 | A1 | 1/2010 | Williams et al. |
| 2010/0079676 | A1* | 4/2010 | Kritt et al. ..................... 348/598 |
| 2010/0205667 | A1* | 8/2010 | Anderson et al. ............... 726/19 |
| 2011/0001808 | A1* | 1/2011 | Mentz et al. .................... 348/59 |
| 2011/0018903 | A1* | 1/2011 | Lapstun et al. ............... 345/633 |
| 2011/0206285 | A1* | 8/2011 | Hodge et al. .................. 382/224 |
| 2011/0234629 | A1* | 9/2011 | Kim et al. ..................... 345/629 |
| 2012/0033059 | A1* | 2/2012 | Mihara et al. ................... 348/55 |
| 2012/0086629 | A1* | 4/2012 | Thorn ............................ 345/156 |
| 2012/0105490 | A1* | 5/2012 | Pasquero et al. .............. 345/690 |
| 2012/0249525 | A1* | 10/2012 | Ahn et al. ..................... 345/419 |
| 2013/0103943 | A1* | 4/2013 | Hirsch et al. .................. 713/168 |

FOREIGN PATENT DOCUMENTS

| | | |
|---|---|---|
| EP | 2306363 A1 | 4/2011 |
| GB | 2360414 A | 9/2001 |
| WO | WO-2004066620 A1 | 8/2004 |
| WO | WO-2006107361 A2 | 10/2006 |

OTHER PUBLICATIONS

"Autostereogram", [Online]. Retrieved from the Internet: <URL: http://en.wikipedia.org/wiki/Autostereogram>, (Accessed Feb. 11, 2013), 15 pgs.

"Computer monitor privacy", [Online]. Retrieved from the Internet: <URL: http://www.halfbakery.com/idea/Computer_20monitor_20privacy>, (Accessed Feb. 11, 2013), 2 pgs.

"Designing more secure mobile phones", [Online]. Retrieved from the Internet: <URL: http://www.designcouncil.org.uk/our-work/challenges/Security/Design-out-crime/Hot-Products/>, (Accessed Feb. 11, 2013), 7 pgs.

"European Application Serial No. 11186259.5, Search Report mailed Jul. 17, 2012", 7 pgs.

"Liquid crystal shutter glasses", [Online]. Retrieved from the Internet: <URL: http://en.wikipedia.org/wiki/Liquid_crystal_shutter_glasses>, (Accessed Feb. 11, 2013), 8 pgs.

"Steganography", [Online]. Retrieved from the Internet: <URL: http://en.wikipedia.org/wiki/Steganography>, (Accessed Feb. 25, 2013), 13 pgs.

Maisto, Michelle, "Sharp Creating 3D Cell Phone Displays, No Glasses Required", [Online]. Retrieved from the Internet: <URL: http://www.eweek.com/c/a/Mobile-and-Wireless/Sharp-Creating-3D-Cell-Phone-Displays-No-Glasses-Required-842985/>, (Apr. 2, 2010), 1 pg.

"European Application Serial No. 11186259.5, Amendment filed May 14, 2013", 13 pgs.

"European Application Serial No. 11186259.5, Office Action mailed Feb. 10, 2014", 5 pgs.

* cited by examiner

US 8,966,656 B2

DISPLAYING PRIVATE INFORMATION USING ALTERNATE FRAME SEQUENCING

BACKGROUND

Alternate frame sequencing (AFS) can be used to permit a single user to securely view private information presented on a display screen. AFS can be implemented with a display, such as a display screen configured to display information in discrete frames, and a viewing device, such as active shutter glasses that can be worn by an authorized viewer. To permit the authorized user to view the information presented using AFS, the display and the viewing device are synchronized such that the display screen displays a content frame at the same time that the viewing device permits the user to view the display. Several methods for ensuring the privacy of displayed information have been proposed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
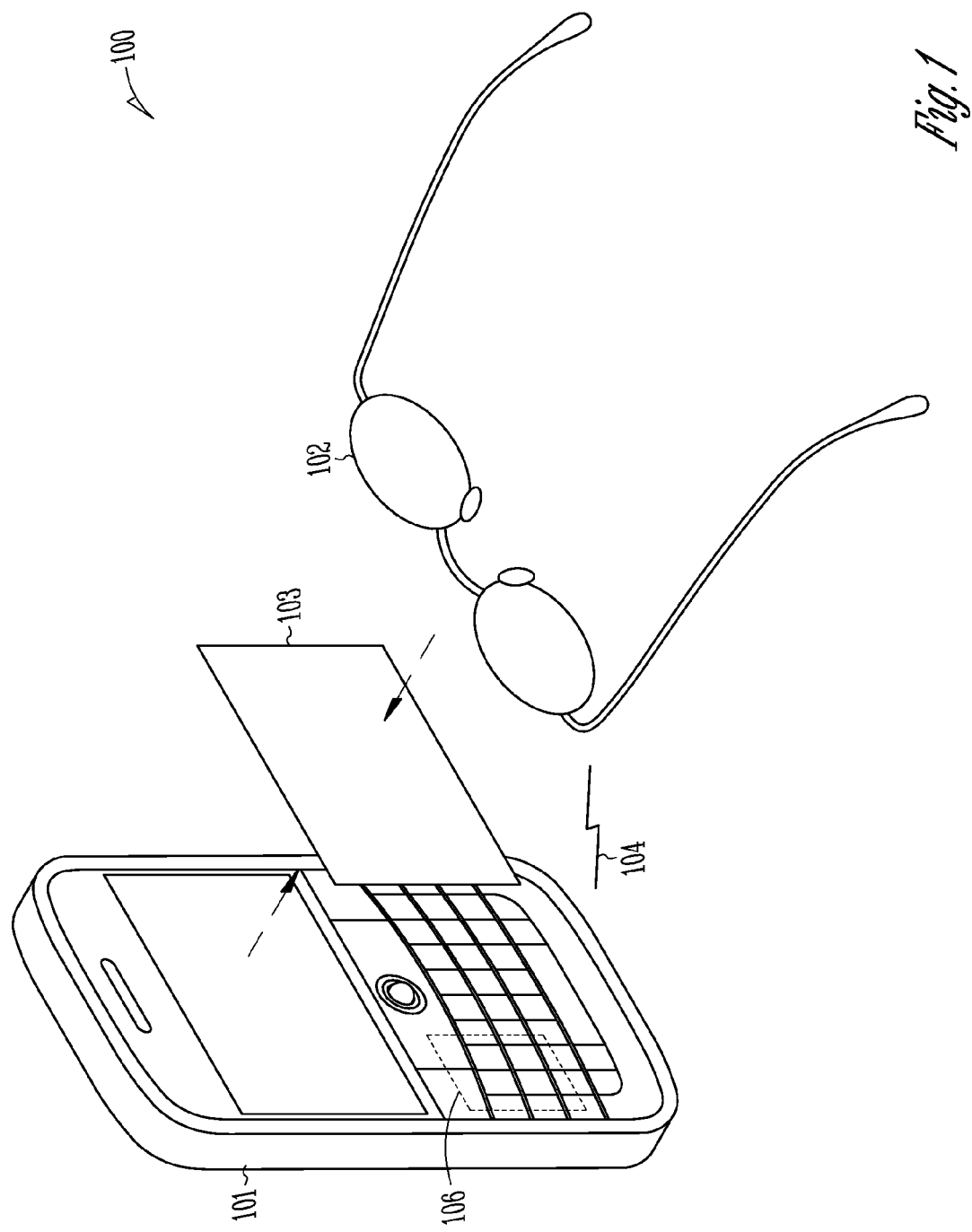
FIG. 1 illustrates generally an example of a portion of a system for viewing private information using alternate frame sequencing according to one embodiment.

Mobile devices or portable electronic devices (such as cellular or mobile telephones, smart phones, portable media players, electronic navigation devices, such as global positioning system (GPS) devices, personal digital assistants (PDAs) or laptop portable computers, such as tablet computers or other laptop computers, among other devices, can be used to display information in practically any location including in a private office, an airport, a crowded subway car, or even in more remote or rural areas. Some of these devices can be handheld—that is, sized and shaped to be held or carried in a human hand. In some locations, displaying sensitive, confidential, personal, or otherwise private information may compromise the security or privacy of the displayed information. For purposes of the following discussion, private information can be any information—including but not limited to movies, videos, pictures, drawings, text, graphics, animations, user interfaces, tables, spreadsheets, cartons, images, documents, messages, or icons—that a user desires to shield or withhold from others, for any reason. For example, someone viewing her bank account information from a mobile device while sitting on an airplane may wish to keep her account information concealed. Sitting in close proximity to others on an airplane, protecting one's account information can be difficult.

Some mobile devices can be configured to display private information in such a manner that only an authorized user can ascertain the displayed information. For example, a laptop computer can be configured to display information using alternate frame sequencing (AFS). Viewing devices, such as active shutter glasses, can be synchronized to the laptop to permit a user wearing the glasses to view the information. The private information may not be ascertainable to an unauthorized viewer, such as someone without appropriately synchronized active shutter glasses.

In an example, a system configured to display private information using AFS can include a mobile display device and a viewing device. The viewing device can be communicatively coupled to the mobile device such as to exchange the synchronization parameters required to enable the user of the viewing device to ascertain the private information displayed using alternate frame sequencing.

To display all information on the mobile device using AFS may render the device unusable without a synchronized viewing device. In the AFS and Non-AFS Display Regions section, this document describes, among other things, an apparatus and method for maintaining basic device functionality while displaying sensitive or private information using AFS.

As a need for greater security arises, AFS glasses configured for a single sequence of viewing frames can be insufficient. For example, a sequence used to permit viewing private information can be ON-OFF-ON-OFF, etc. Such a simple sequence may compromise the security of displayed confidential information because any unauthorized viewer with shutter glasses operating according to this sequence may be able to view the confidential information. To enhance security, synchronization parameters including the frame display rate or the frame display duration can be changed according to a pseudo-random sequence. In the Enhanced AFS Security Techniques section, this document describes, among other things, an apparatus and method for encrypting synchronization parameters and periodically exchanging the synchronization parameters between the display device and the viewing device to maintain synchrony, such as between one or more viewing devices and one or more display devices.

In an example, a user may need to quickly and easily identify when and where to display private information using AFS. In the AFS Security Techniques using Environmental Parameters section, this document describes, among other things, an apparatus and method for receiving location-based environment parameters indicative of a security level, and using the environment parameters to establish a device security profile. The security profile can be used to determine what, if any, information can be displayed using alternate frame sequencing.

In an example, a group viewing a single display can concurrently view different information using AFS. The synchronization parameters of the display and the synchronization parameters associated with each viewer's unique active shutter glasses can determine, at least in part, what each viewer will ascertain or perceive on the display. In the AFS Systems for Multiple Viewers and Multiple Clearance Levels section, this document describes, among other things, an apparatus and method for providing, to multiple contemporaneous viewers of a single display, individual viewing profiles. The individual viewing profiles can be configured such that each viewer can ascertain different portions of the same private image.

FIG. 1 illustrates generally an example of a portion of a system for viewing private information using alternate frame sequencing. The example of FIG. 1 can include a system 100 for viewing private information using alternate frame sequencing (AFS). The system 100 can include a display device 101, a viewing device 102, a private image 103, or a sensor 106. The display device 101 and the viewing device 102 can communicate, such as using a communicative data coupling 104.

The display device 101 can be any device configured to display visual information using AFS. For example, the display device 101 can be, among other things, a mobile telephone, a smart phone, a PDA, a laptop computer, a projector and a viewing screen, or any other display device configured to display frames of visual information in rapid succession.

In an example, displaying information using AFS can include displaying, using the display device 101, a first frame for a first duration, the first frame including the private image 103. A second frame can be displayed for a second duration subsequent to the first duration. The first and second frames can be displayed in succession at a sufficient frame display rate such that a viewer of the display can interpret the visual summation of the first and second frames. The second frame can include image components that, when visually added to the first frame, produce a false image, such as a neutral gray image, a featureless image, or some other image that is not the private image. In an example, the private image can include a series of private images, such as an animation sequence. To maintain the false image, the image of the second frame can be configured to continuously adapt to each frame in the animation sequence. In an example, the second frame can include several frames to create the false image, or the false image can itself be an animation sequence.

The viewing device 102 can be any device configured to permit or preclude viewing of a display, such as on a frame-by-frame basis. For example, the viewing device 102 can be, among other things, any type of active shutter glasses (e.g. liquid crystal shutter glasses), a single lens configured to operate in substantially transparent and opaque states, or a set of lenses configured to operate independently in substantially transparent and opaque states. For example, the viewing device 102 can include two monocular viewing lenses under independent processor control such that one eye can be exposed to a transparent lens while the other eye is exposed to an opaque lens.

The private image 103 can be any image that can be rendered by the display device 101. For example, the private image 103 can include, among other things, text, graphics, or a sequence of text or graphics, such as a moving picture or animation sequence.

An authorized user can ascertain the private image 103 by using the viewing device 102 synchronized to the AFS display synchronization parameters. For example, the viewing device 102 can be binocular LC shutter glasses. The shutter glasses can be synchronized to the display such that the viewing lenses are configured to operate in a transparent state during a first duration, and to subsequently enter an opaque state during a second duration. Thus, the authorized user wearing the shutter glasses can ascertain the private image 103 displayed during the first duration, and can be precluded from viewing the second frame displayed during the second duration. Because the user will not perceive the visual summation of the information in the first and second frames, the user can ascertain the private image 103.

The communicative data coupling 104 can be any system of transmitters and receivers configured to exchange information. For example, the communicative data coupling 104 can include, among other things, a wireless data coupling, such as a Bluetooth connection, an infrared (IR) connection, or a wired connection, such as using any data communication protocol (e.g., 802.11).

The viewing device 102 can be configured to receive a message including a synchronization parameter, such as using the communicative data coupling 104. In an example, the synchronization parameter can be encrypted using a rotating decryption key, as discussed below of FIG. 11.

The sensor 106 can be any sensor device or combination of sensor devices configured to receive user input or to receive information about an environment. For example, the sensor 106 can include, among other sensors, a camera, a GPS signal receiver, or a microphone.

The system 100 shown in FIG. 1 can be used generally to permit a user of the viewing device 102 to view private information on the display device 101, the private information displayed using AFS, according to one or more synchronization parameters, and the viewing device 102 employing the synchronization parameters to view the private image 103. As further described in the discussion of FIGS. 2 through 9, the system 100 can be configured to display private information in one of several regions on a display portion of the display device 101. As further described by FIGS. 15 through 18, the system 100 can be configured to display private information to groups of viewers, such as including at least one display device 101 and two or more viewing devices 102 configured for concurrent use. As further described by FIGS. 10 and 11, the security of the system 100 can be enhanced, for example, by the exchange of encrypted synchronization parameters between the viewing device 102 and the display device 101, such as using the communicative data coupling 104. As further described in the discussion of FIGS. 12 through 14, a security enhancement can include the use of sensors 106 to sense environmental parameters. Using the sensed environmental parameters, the system 100 can be configured to display private information using AFS.

AFS and Non-AFS Display Regions

Figure 2:
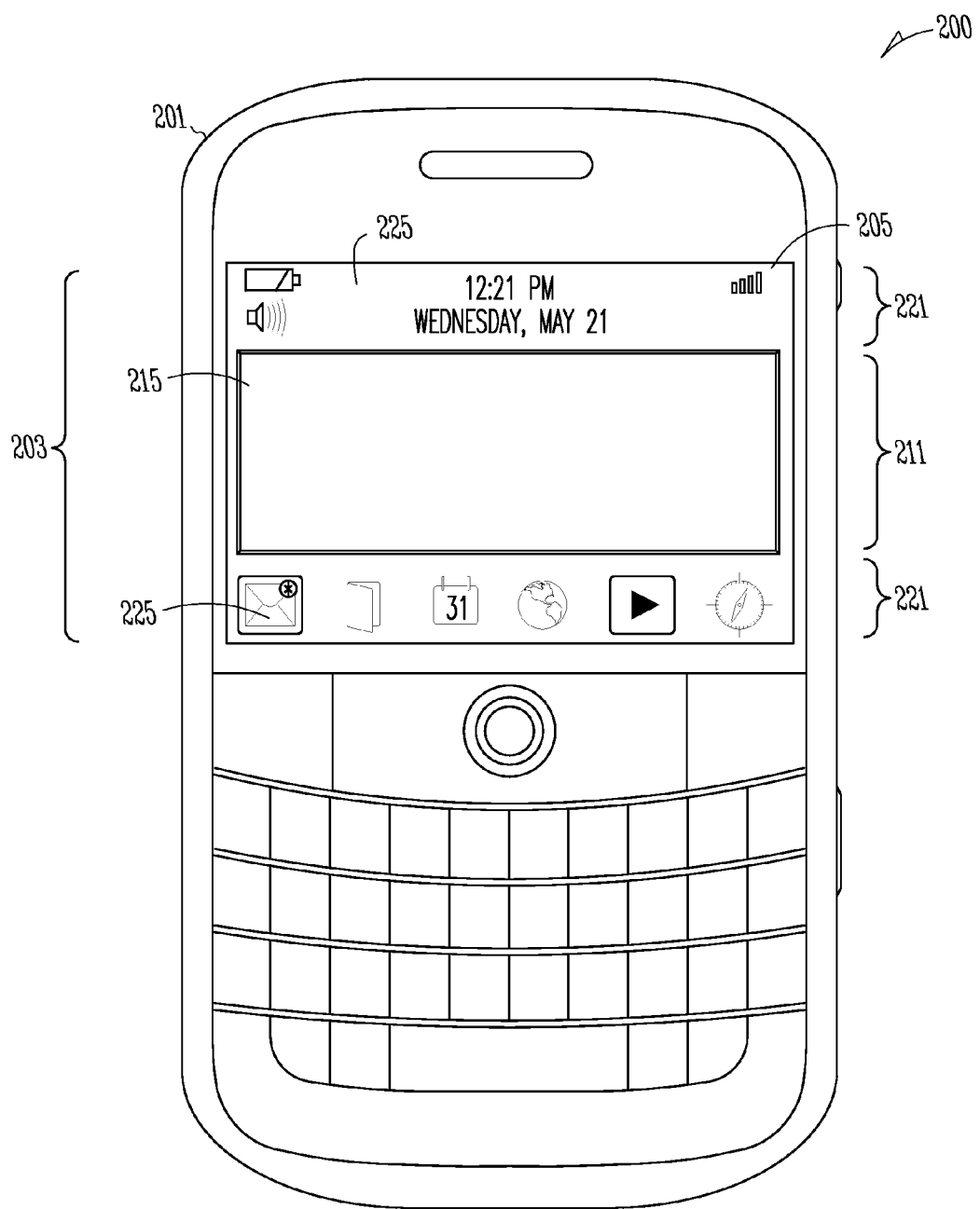
FIG. 2 illustrates generally an example of a portion of a system that can include a mobile device configured to display information in multiple different display regions according to one embodiment.
Figure 3:
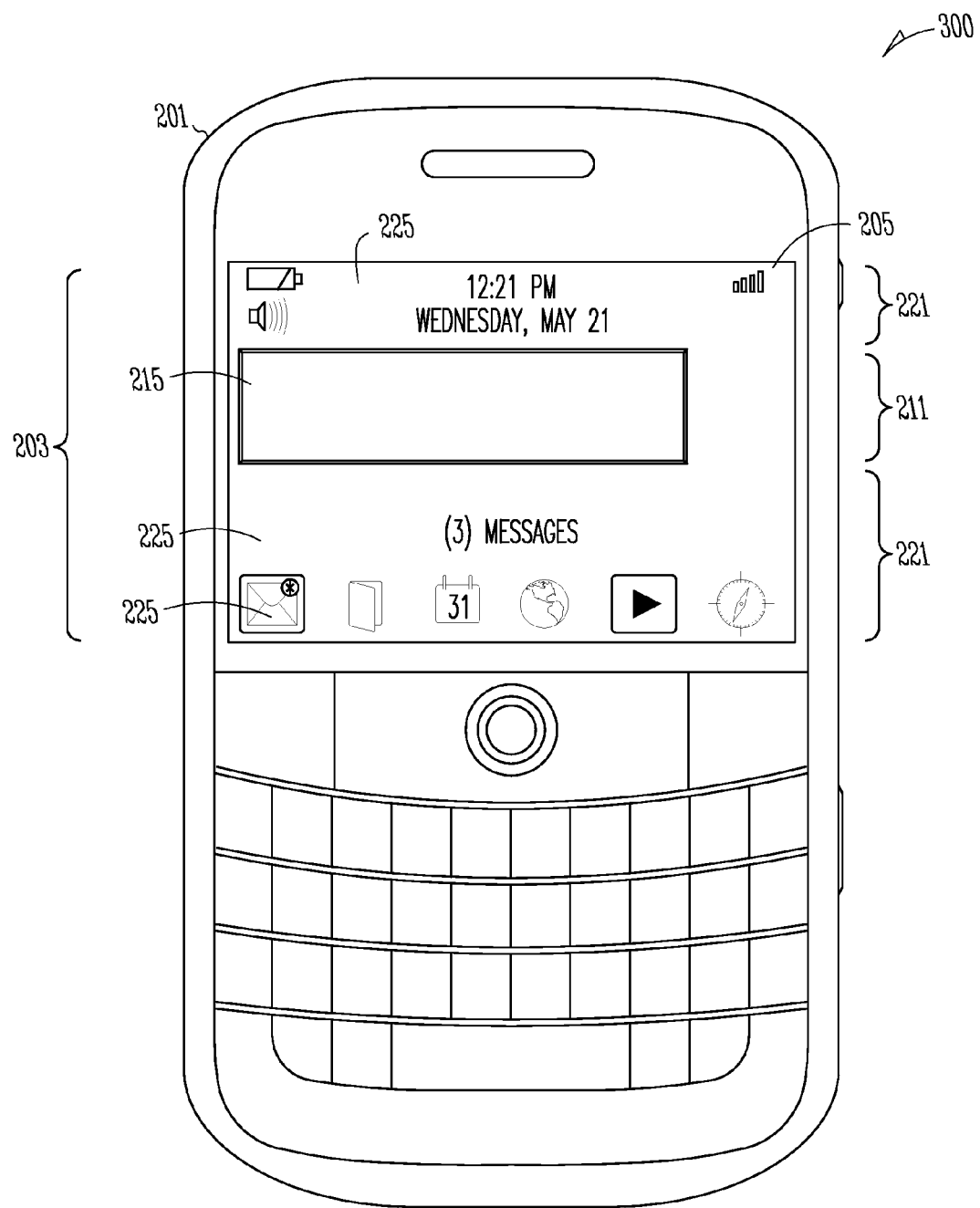
FIG. 3 illustrates generally an example of a portion of a system that can include a mobile device configured to display information in multiple different display regions according to one embodiment.

FIGS. 2 and 3 illustrate generally an example of a portion of a system that can include a mobile device configured to display information in multiple different display regions. For example, FIG. 2 illustrates generally an example of a system 200 configured to display information, wherein the system 200 is configured to display at least some information using alternate frame sequencing. The system 200 can include a mobile device 201. The mobile device 201 can be configured with a user interface 203, including a display 205. The display 205 can be configured to display at least a first display region 211 and a second display region 221. In an example, the first display region 211 can be configured to display a private image 215 including private information. The second display region 221 can be configured to display a public image 225 including public information. (In general, public information can be any information that is not private information.) In an example, the first display region 211 can be configured to display the private information using AFS.

The mobile device 201 can be any mobile device configured with a display 205. For example, the mobile device 201 can include the attributes of the display device 101 discussed above. The mobile device 201 can be a mobile telephone, a tablet or laptop computer, or a PDA, among other devices.

The user interface 203 can be any processor-driven user interface configured to accept a data input, such as from a user, or to display information to a user. For example, the user interface 203 can be configured to receive a user input, such as using a keyboard, or to display information to a user, such as using the display 205.

The display 205 can be any display device configured to present information in discrete frames at a frame display rate such that a viewer can perceive the visual summation of two consecutive frames. For example, the display 205 can include an LCD display, or a CRT monitor, such as can be configured to alternate the display of two discrete frames at a display rate of about 30 frames per second (fps) or more.

The first display region 211 and the second display region 221 can be any regions of the display 205. In an example, the display 205 can be a rectangular display area horizontally divided into two display regions including a top half and a bottom half. The first display region 211 can be configured to occupy the top half of the display 205, and the second display region 221 can be configured to occupy the bottom half of the display 205. The regions on the display 205 need not be so rigidly divided. In an example, the first display region 211 and the second display region 221 can be any size and shape that the display 205 is capable of rendering. For example, the first display region 211 can overlap a portion of the second display region 221 and vice-versa.

In an example, more than one region of the display 205 can be configured as the first display region 211, or more than one region of the display 205 can be configured as the second display region 221. The display 205 can be configured to display other regions in addition to the first display region 211 and the second display region 221.

The private image 215 can be any image displayed using the display 205. In an example, a user can indicate as private any image, any set of data, or any data associated with some attribute. For example, a confidential email message can be private information. Consequently, displaying the confidential email message can correspond to displaying the private image 215. Similarly, the public image 225 can be any image displayed using the display 205. A user can indicate as public any image, any set of data, or any data associated with some attribute. For example, a non-confidential email message can be public information. Consequently, displaying the non-confidential email message can correspond to displaying the public image 225.

In an example, the display 205 can be configured to present the user interface 203. Standard user interface information, including time, date, status information, or functional icons, among other features, can be viewable, at least in part, using the second display region 221, such as without using AFS. For example, the public image 225 can include device status information, such as a battery charge level indicator, a mail notification icon, time and date information, or a cellular telephone service quality indicator. The public image 225 can further include several icons configured to perform tasks, such as to launch a mobile messaging program, a digital notebook program, or an entertainment program, among others. In the example of FIG. 2, the first display region 211 can be configured to occupy all regions of display 205 except those regions configured to display the standard user interface information.

FIG. 3 illustrates generally an example of a system 300 that can include the mobile device 201. In the example of FIG. 3, the second display region 221 can be configured to occupy regions of the display 205 in addition to those regions configured to display the standard user interface information. By allocating additional display area to the second display region 221, additional information can be displayed publicly. In an example, the size of the first display region 211, including the private image 215, can be re-sized such as by dragging the corner of the first display region 211 using a touch-screen gesture, or using a keyboard or mouse command. The first display region 211 can be moved around the display 205 using similar gestures or commands, just as an active window can be moved around a graphical interface on a computer screen. The private image 215 displayed using AFS can thus change size, shape, and location on the display 205, such as in response to a user input or according to a processor-defined algorithm.

The first display region 211 can be automatically re-sized or moved to another region of the display 205. For example, a public notification of an incoming call to a mobile device could be displayed as the public image 225 in the second display region 221. To permit adequate display screen area for the call notification, the first display region 211 can be minimized or relocated.

FIGS. 4, 5, 6, and 7 illustrate generally examples of displayed images that can be perceived by an unauthorized user. These examples can include, among other elements, the display 205, the first display region 211 configured to display information using AFS, and an example of an image perceived without using a synchronized viewing device 216.

Figure 4:
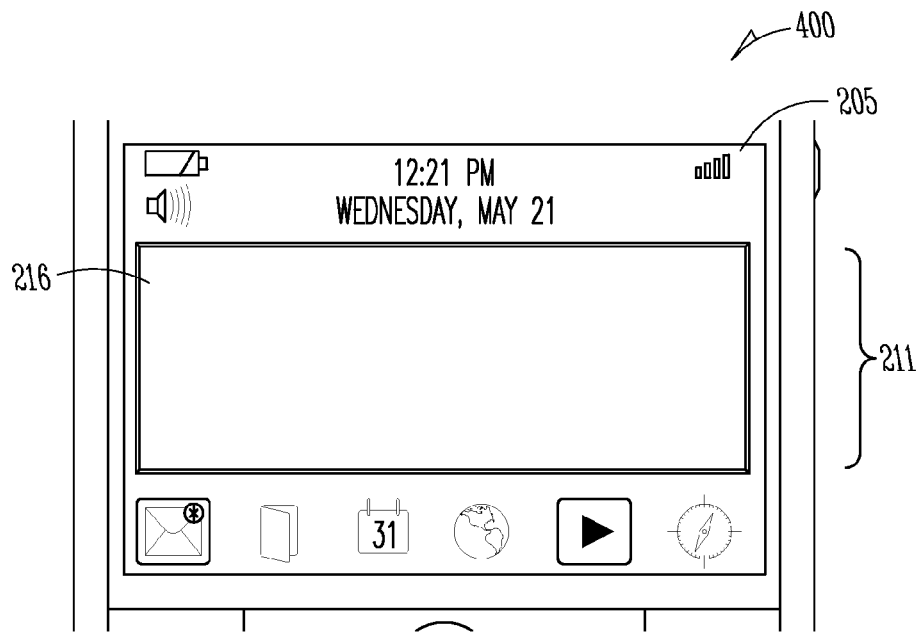
FIG. 4 illustrates generally an example of a displayed image that can be perceived by an unauthorized user according to one embodiment.
Figure 5:
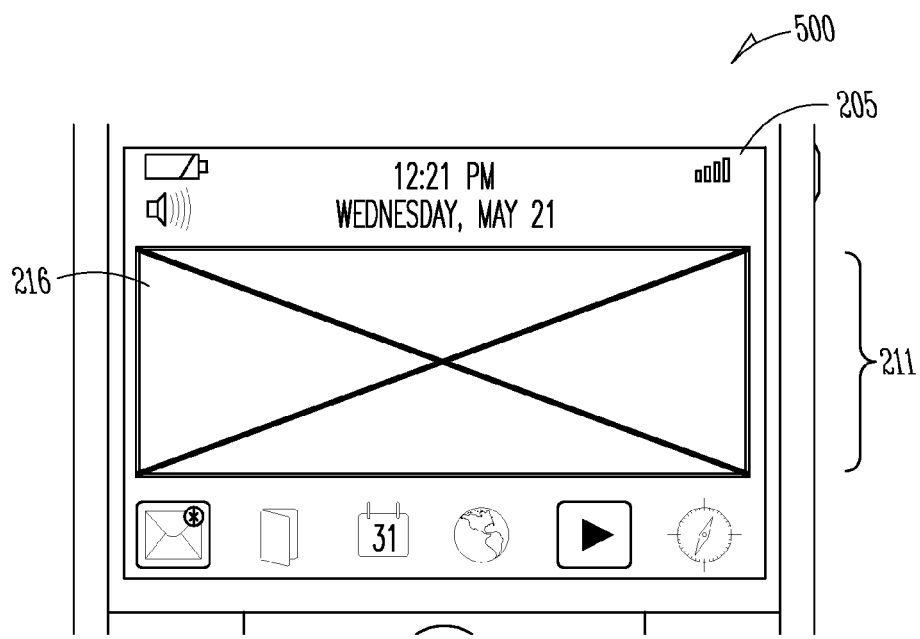
FIG. 5 illustrates generally an example of a displayed image that can be perceived by an unauthorized user according to one embodiment.

In the example of FIG. 4, the image perceived without using a synchronized viewing device 216 can include a substantially featureless image, such as a neutral gray image. In the example of FIG. 5, the image perceived without using a synchronized viewing device 216 can include a substantially featureless image, such as a neutral gray image, including an image of an "X" symbol to indicate that the display region is unavailable to an unauthorized viewer. In an example, the "X" symbol can be displayed using a color contrasting with the featureless background, such as a red "X" symbol and a gray background.

Figure 6:
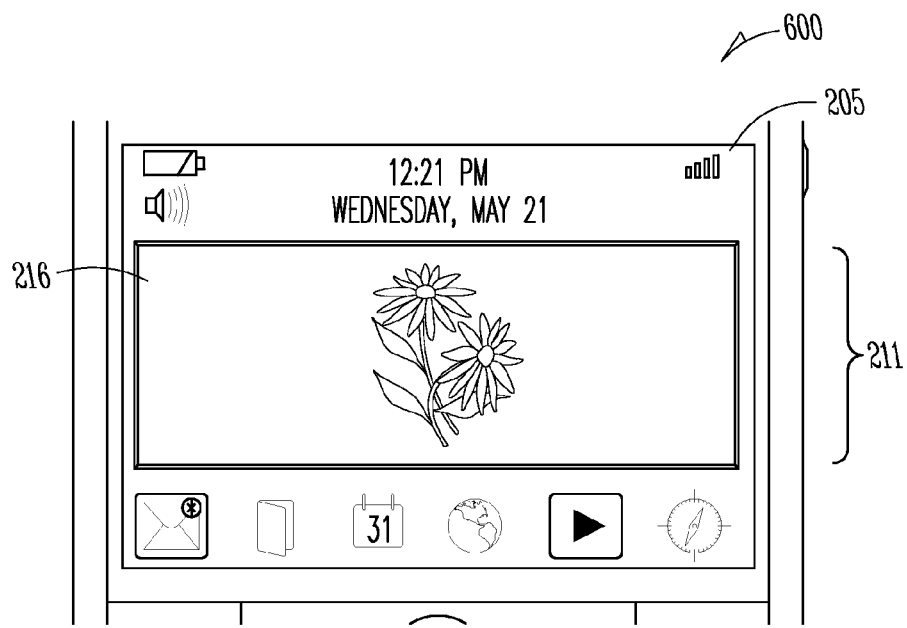
FIG. 6 illustrates generally an example of a displayed image that can be perceived by an unauthorized user according to one embodiment.

In the example of FIG. 6, the image perceived without using a synchronized viewing device 216 can be any image that is not the private image 215. For example, while the private image 215 can be a confidential email message, the image perceived without using a synchronized viewing device 216 can be an image of a flower bouquet, or a garden, or a supermarket, or a city skyline, or any other image that is not the private image 215. The image that is not the private image 215 can be displayed in color or in grayscale. In an example, the image perceived without using a synchronized viewing device 216 can be a series of images, such as an animated sequence, or a screen-saver image. In the examples of FIGS. 4, 5, and 6 an unauthorized viewer would receive no overt indication that private or confidential information is otherwise presented on the display 205.

Figure 7:
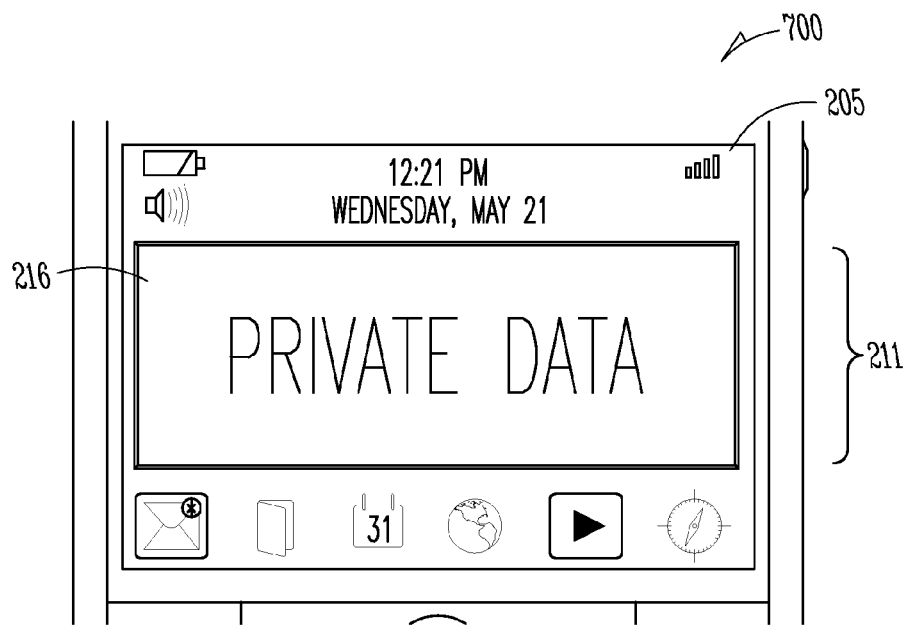
FIG. 7 illustrates generally an example of a displayed image that can be perceived by an unauthorized user according to one embodiment.

In the example of FIG. 7, the image perceived without using a synchronized viewing device 216 can include text such as to display "PRIVATE DATA" or "CONFIDENTIAL INFORMATION" or another similar word or phrase to indicate that the sensitive information presented on the screen is unavailable to an unauthorized viewer.

Figure 8:
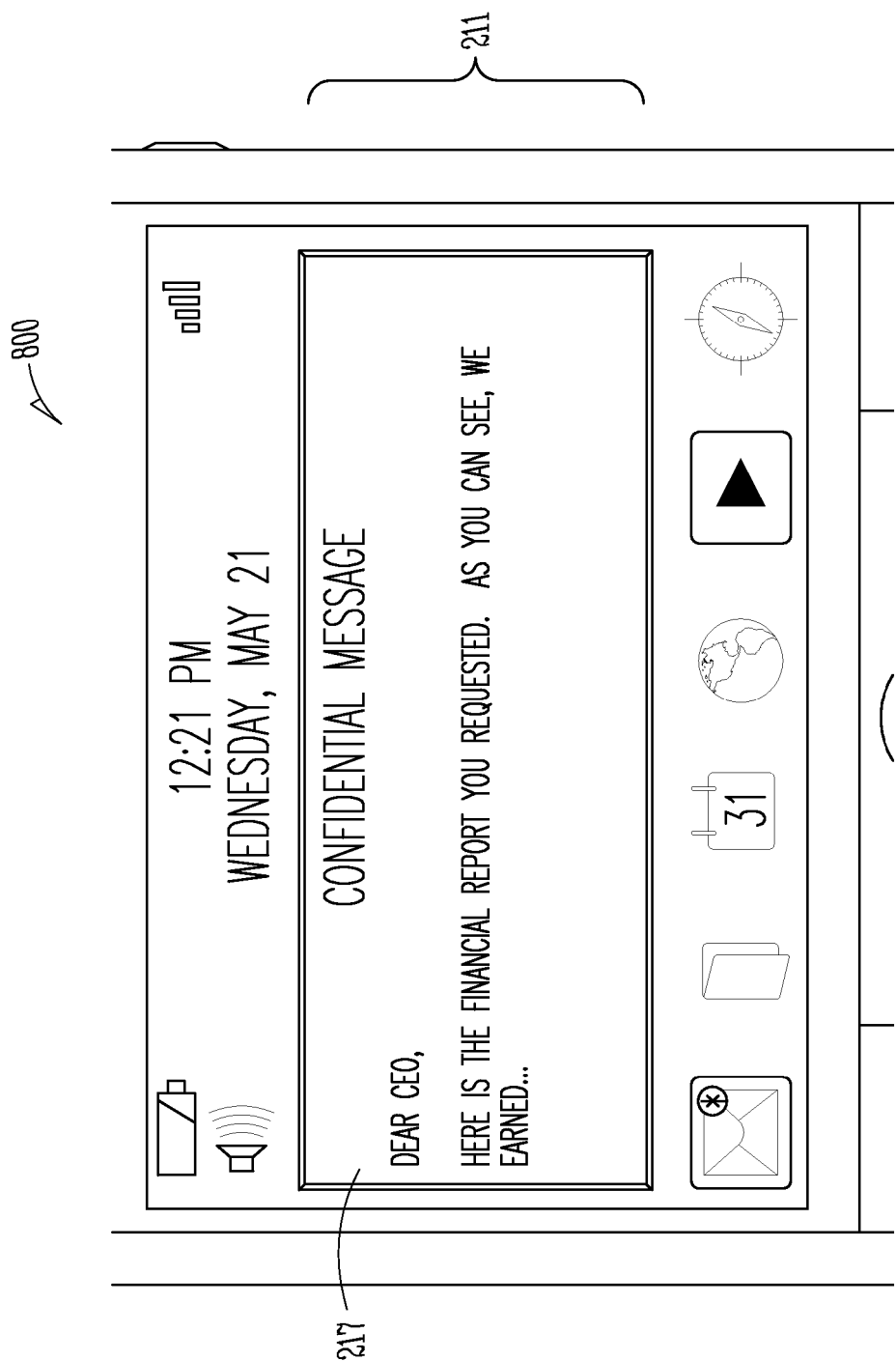
FIG. 8 illustrates generally an example of an image ascertained by an authorized user according to one embodiment.

FIG. 8 illustrates generally an example of an image ascertained by an authorized user. In the example of FIG. 8, a system 800 can include the display 205, the first display region 211 configured to display information using AFS, and an example of an image ascertained using a synchronized viewing device 217. An authorized user can use the viewing device 102 to view the display 205 including the first display region 211.

Employing the AFS synchronization parameters used by the display 205, the viewing device 102 can be configured to enable a user of the viewing device 102 to view the private image 215, which can be the same as the image ascertained using a synchronized viewing device 217. In the example of FIG. 8, the private image 215 can include confidential correspondence detailing a financial issue.

In an example, content to be displayed on a device can be analyzed by a processor to determine if the content should be displayed in the first display region 211 using AFS, or if the content should be displayed in the second display region 221 where AFS is not used. For example, as depicted in FIG. 8, a device can be configured to display an encrypted email message in the first display region 211 using AFS. Similarly, all information exchanged using a secure hyper text transfer protocol can be configured for display in the first display region 211 using AFS, while the information exchanged using an unsecure hyper text transfer protocol can be, by default, configured for display in the second display region 221 without using AFS.

Figure 9:
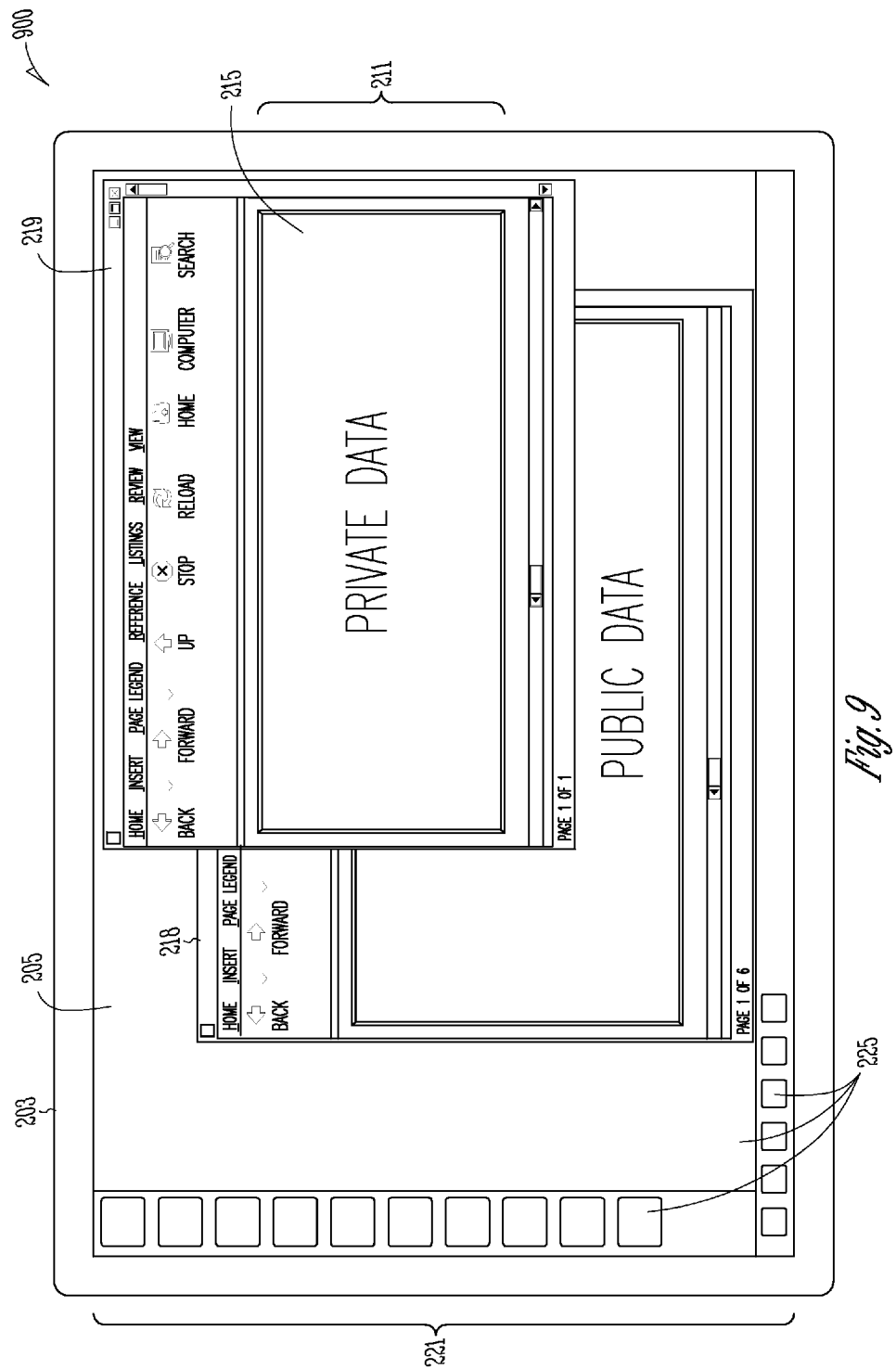
FIG. 9 illustrates generally an example of a portion of a system that can include a mobile device, such as a laptop computer, according to one embodiment.

FIG. 9 illustrates generally an example of a portion of a system that can include a mobile device such as a laptop computer. The example of FIG. 9 can include a system 900, including a desktop user interface 203, the display 205, the first display region 211, the private image 215, the second display region 221, the public image 225, an active display region 217, and an inactive display region 218.

The user interface 203 can be implemented using any display device configurable to present information using AFS. For example, the user interface 203 can include a laptop or desktop computer monitor, a display screen presented using a DLP projector, or any other processor-driven display device.

The active display region 217 can be any region of the display 205 with which a user is actively engaged. For example, the active display region 217 can include a working region of a word processor program, or a region where a motion picture is displayed.

The basic user interface and associated desktop icons, or a taskbar including program status information, for example, can be public images 225 displayed in the second display region 221. In an example, the first display region 211 can include all or a portion of an active display region 217, or the first display region 211 can include an inactive display window 218.

In an example, the first display region 211 can be limited to the working area of the active display region 217, or can be similarly limited to the inactive display window 218. In an example, an entire active window 219, including the user interface information associated with that active window, such as a menu bar or status information, can be included in the first display region 211. In an example, all instances of a particular program, such as a word processor, can be configured for display in the first display region 211 using AFS.

In an example, private information displayed in the active display region 217 can be displayed using AFS. If the active display region 217 is then de-activated and becomes the inactive display window 218, the private information can, for example, continue to be displayed using AFS, or can be removed entirely from the display screen until the window is again re-activated.

Figure 10:
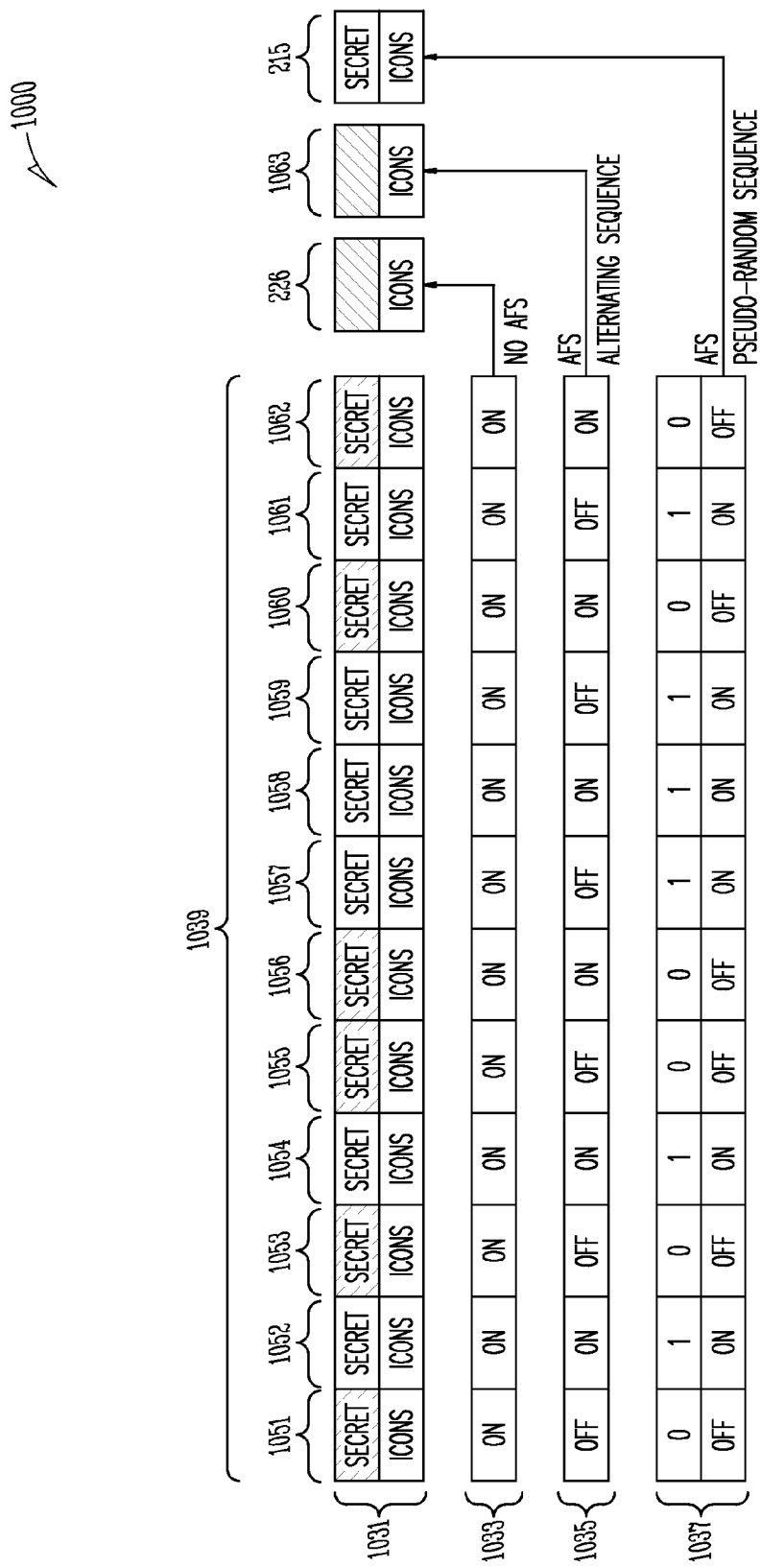
FIG. 10 illustrates generally an example that can include an authentication scheme according to one embodiment.
Figure 11:
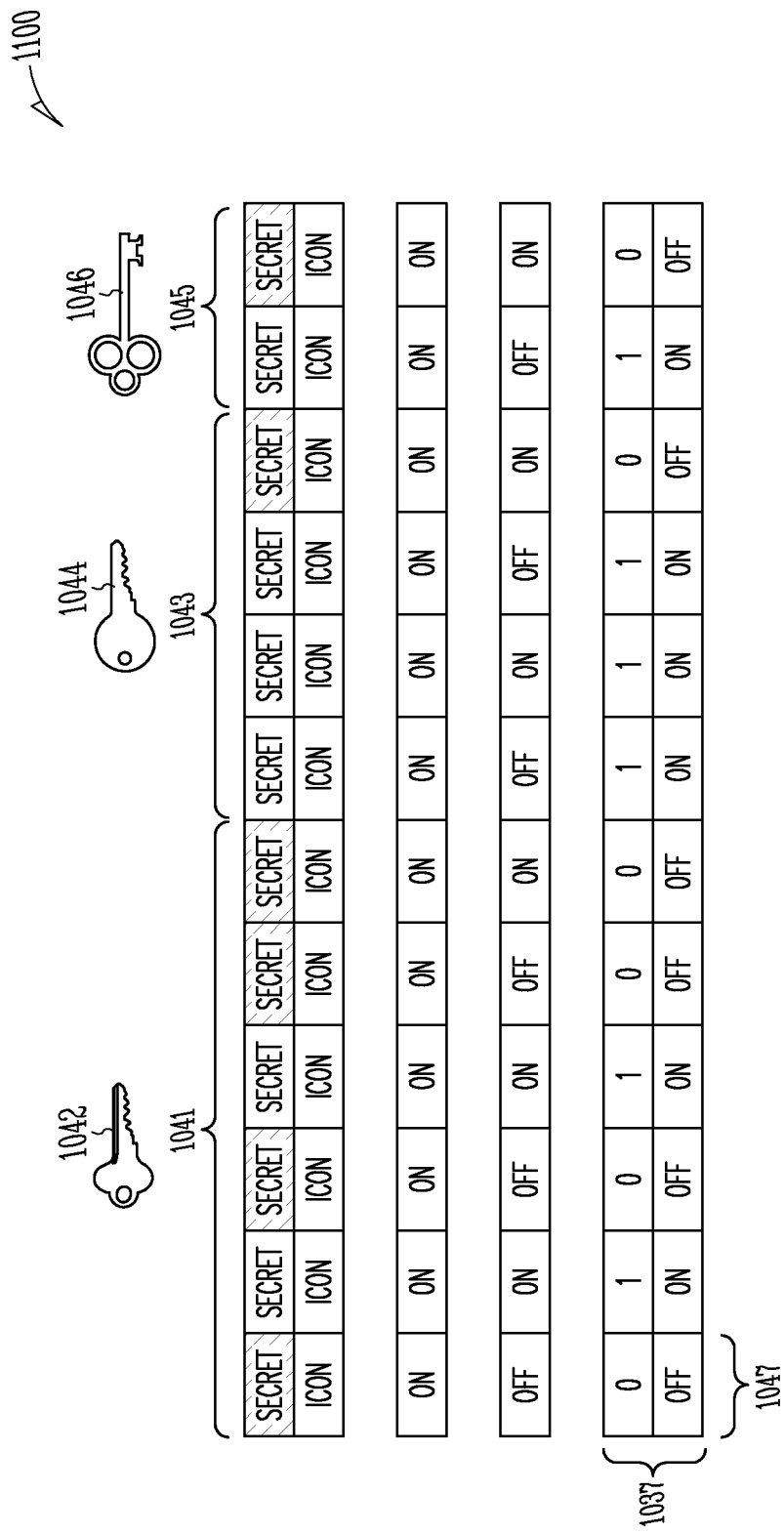
FIG. 11 illustrates generally an example that can include an authentication scheme, including a series of decryption keys, according to one embodiment.

Several examples of systems configured to display private information using AFS have been described generally in FIGS. 2 through 9. Alternative systems incorporating AFS display regions can be implemented as well. FIGS. 10 and 11 are now directed to explaining enhanced security techniques for the system 100.

Enhanced AFS Security Techniques

FIG. 10 illustrates generally an example that can include an authentication scheme. The example of FIG. 10 can include an AFS implementation 1000. The AFS implementation 1000 can include a displayed content sequence 1031, a public-view frame sequence 1033, a simple alternating frame sequence 1035, a pseudo-random frame sequence 1037, an authentication period 1039, a publicly ascertainable image 226, the private image 215, and an image ascertained using simple AFS 1063.

The displayed content sequence 1031 can include a series of displayed frames including a first frame 1051, a second frame 1052, a third frame 1053, and so on. The number of displayed frames can be indefinite or can include a discrete number of one or more frames. The displayed content sequence 1031 can include, in the example of FIG. 10, twelve discrete frames.

Each frame (1051, 1052, 1053, etc.) can include a primary, or secret, image, and an inverse, or inverse secret image. The primary image can be any visual representation that can be rendered by the display 205. The inverse image can be an image associated with the primary image such that each discrete color component of the primary image is present inversely in the inverse image, the primary and inverse color components in corresponding locations. For example, the primary image can include a white pixel at a first location, and a black pixel at a second location. The inverse image can include a black pixel at the first location, and a white pixel at the second location.

In the example of FIG. 10, the displayed content sequence 1031 can include, in the first frame 1051, an inverse secret image, such as configured for display in the first display region 211, and icons, or an image that is not secret, displayed in the second display region 221. The secret image can be the private image 215, and the icons can be the public image 225. In the second frame 1052, the example can include the secret image in the first display region 211 and icons displayed in the second display region 221. In the third frame 1053, the example can include the inverse secret image in the first display region 211 and icons displayed in the second display region 221. Subsequent frames can be configured to display the secret image, the inverse secret image, and icons, as illustrated.

The displayed content sequence 1031 can include an approximately equal number of secret images and inverse secret images such that, when presented by the display 205 at a sufficient frame display rate, the publicly ascertainable image 226 can substantially be the visual summation of the secret image and the inverse secret image. For example, the visual summation of the secret image and the inverse secret image can be a neutral, or substantially featureless, image. In an example, the visual summation of the secret image and the inverse secret image can be some other image, such as one of the images 216 (see FIG. 4, 5, 6, or 7 and corresponding discussion, above).

In the example of FIG. 10, the public-view frame sequence 1033 can indicate the viewing device 102 operated in a transparent mode (i.e. "ON"), or it can indicate the nonuse of the viewing device 102. A public viewer viewing the display 205 according to the public-view frame sequence 1033 will view the publicly ascertainable image 226. In an example, the publicly ascertainable image 226 can include, in the first display region 211, the visual summation of the secret image and the inverse secret image, and in the second display region 221, the icons. Thus, the private image 215 can be unascertainable by a public viewer. The public viewer can thus be permitted to view only the visual summation of the secret image and the inverse secret image. In an example, the visual summation can be an image that is not the private image 215, such as a featureless gray image, or another image or sequence of images.

In the example of FIG. 10, the simple alternating frame sequence 1035 can indicate bimodal operation of the viewing device 102 such that the lenses of the viewing device 102 are successively transparent and opaque. In the simple alternating frame sequence 1035 depicted in FIG. 10, "ON" can indicate a transparent lens state and "OFF" can indicate an opaque lens state. Because the icons, or public information, are displayed in each frame, the image ascertained using simple AFS 1063 can include the icon information. However, the viewing device 102, operating according to the simple alternating frame sequence 1035, can preclude the user of such a device from viewing the private image 215. In the simple alternating frame sequence 1035 example of FIG. 10, an equal number of frames showing the secret image and the inverse secret image will be presented to the user. Thus, at a sufficient frame display rate, the image ascertained using simple AFS 1063 can be substantially equivalent to the publicly ascertainable image 226; that is, the icons can be visible and the private information can be precluded from the view of an unauthorized viewer.

In the example of FIG. 10, the pseudo-random frame sequence 1037 can indicate the viewing device 102 operated according to a frame sequence that will enable a user to ascertain the secret image, including the private image 215. In the pseudo-random frame sequence 1037, the viewing device 102 can be configured to enter the "ON," or transparent, state at predefined intervals corresponding to the display of the secret image. The viewing device 102 can be configured to enter the "OFF," or opaque, state at predefined intervals corresponding to the display of the inverse secret image. The viewing device 102, operating according to the pseudo-random frame sequence 1037, can therefore enable a user to ascertain the secret image, including the private image 215, and the icons.

In the example of FIG. 10, six of the twelve frames include the secret image and six of the twelve frames include the inverse secret image. However, the number of secret images displayed need not equal the number of inverse secret images. In an example, a number of secret images can be displayed with an unequal number of scrambler images, which may or may not include the inverse secret image. Images other than the inverse secret image can be used to achieve different visual summation effects. In addition, the duration of time each frame is displayed can be adjusted to achieve a desired summation effect.

The security of the system 100 for viewing private information using AFS can depend in part on the pseudo-random frame sequence 1037 and the authentication period 1039. An unauthorized user would have to intercept and apply the pseudo-random frame sequence 1037 and the authentication period 1039 using a rogue viewing device to ascertain the private image 215.

The authentication period 1039 can include, for example, a number of frames, or a duration, among other parameters. In the example of FIG. 10, the authentication period 1039 can include twelve discrete frames. The twelve frame sequence can repeat, such as three times per second, to achieve a frame display rate of 36 frames per second. In an example, the authentication period 1039 can be 0.3 seconds. In such an example, each of the twelve discrete frames can be configured for display for an equal duration, or 0.025 seconds. Such an example would correspond to a frame display rate of 40 frames per second. Successful AFS security according to the present disclosure can also be achieved using more rapid or slower frame display rates.

To enhance the security of the system 100, an authentication step, including authenticating the display device 101 and the viewing device 102 prior to the display of the private image 215, can be performed. In an example, the viewing device 102 can communicate a message, including a public encryption key, such as a rotating public encryption key, to the display device 101, or to a third party device handling the device handshaking, such as before synchronization parameters, including the pseudo-random frame sequence 1037, are exchanged between the devices. The display device 101 can be configured to accept the public encryption key and, in response to receiving an appropriate public encryption key, return a message including synchronization parameters encrypted using the public encryption key. The display device 101 and the viewing device 102 can be configured to implement the synchronization parameters at an appropriate time such that a user of the viewing device 102 can be enabled to ascertain the private image 215.

In an example, the exchange of synchronization parameters can include exchanging the synchronization parameters using the communicative data coupling 104. For example, the synchronization parameters, including the pseudo-random sequence 1037, can be exchanged via Bluetooth.

An authentication, including the exchange of synchronization parameters using public key cryptography, can occur at least once for an authentication period. For example, an authentication period can include a discrete number of frames, such as twelve frames. New synchronization parameters can be exchanged for every subsequent bundle of twelve frames such that the viewing device 102 can use a new pseudo-random frame sequence 1037 for each set of twelve frames. The frequency of synchronization parameter exchange can be determined by system capacity and desired level of security, among other factors.

In the example of FIG. 10, the system 100 can be configured to display information using AFS at a frame display rate of 36 frames per second. Prior to time t=0 s, the viewing device 102 and the display device 101 can exchange the pseudo-random frame sequence 1037 (i.e., OFF-ON-OFF-ON-OFF-OFF-ON-ON-ON-OFF-ON-OFF) for implementation at time t=0 s. Prior to time t=0.33 s, the viewing device 102 and the display device 101 can exchange a second pseudo-random frame sequence (e.g., OFF-OFF-OFF-ON-ON-OFF-ON-OFF-ON-OFF-ON-ON) for implementation at time t=0.33 s. Since both the viewing device 102 and the display device 101 will have the same synchronization parameters for times t=0 through t=0.66 s, the user of the viewing device 102 will be able to ascertain the private image 215 for 0.66 seconds.

In an example, the authentication can occur at discrete time intervals. For example, an authentication can occur every second. In such an example, if the twelve frame sequence depicted in FIG. 10 is configured to display at a rate of 36 frames per second, the display device 101 and the viewing device 102 can be configured to re-authenticate after the authentication period 1039 repeats three times. In this example, prior to time t=0 s, the viewing device 102 and the display device 101 can exchange the pseudo-random frame sequence 1037 (i.e., OFF-ON-OFF-ON-OFF-OFF-ON-ON-ON-OFF-ON-OFF) for implementation at time t=0 s. Prior to time t=1.0 s, the viewing device 102 and the display device 101 can exchange a second pseudo-random frame sequence (e.g., OFF-OFF-OFF-ON-ON-OFF-ON-OFF-ON-OFF-ON-ON) for implementation at time t=1.0 s. Since both the viewing device 102 and the display device 101 will have the same synchronization parameters for times t=0 through t=2.0 s, the user of the viewing device 102 will be permitted to view the private image 215 for 2.0 seconds.

In an example, the periodic re-authentication can include receiving one or more synchronization parameters. A failure to re-authenticate can include removing the private image 215 from the display, such as until a successful re-authentication event occurs.

To further enhance the security of the AFS implementation 1000, several authentication periods can be established. FIG. 11 illustrates generally an example that can include an authentication scheme including a series of decryption keys.

The example of FIG. 11 can include a second AFS implementation 1100. The second AFS implementation 1100 can include a first authentication period 1041, a subsequent authentication period 1043, a second subsequent authentication period 1045, a first public encryption key 1042, a subsequent public encryption key 1044, a second subsequent public encryption key 1046, or a frame display duration 1047.

In an example, the first authentication period 1041 can include six discrete frames. To view the secret image shown during the first authentication period 1041, the viewing device 102 can be configured according to the pseudo-random frame sequence 1037 associated with the first authentication period 1041. In the example of FIG. 11, this would correspond to a sequence of "OFF-ON-OFF-ON-OFF-OFF." This sequence can correspond to a first set of synchronization parameters that can be implemented by the display device 101 and the viewing device 102. The first set of synchronization parameters can be exchanged, such as using the first public encryption key 1042. The first authentication period 1041 can be configured to repeat for any number of frames, or any duration, according to the synchronization parameters used. In an example, the first authentication period 1041 can include six frames and can be configured to repeat six times. In an example, the number of repetitions can be calculated based on one or more synchronization parameters. For example, the number of repetitions can be equal to twice the number of frames comprising the authentication period, or the number of repetitions can be equal to the number of frames displaying the secret image.

The subsequent authentication period 1043 can be configured to immediately follow the first authentication period 1041. The subsequent public encryption key 1044 can be used to securely exchange the synchronization parameters, including the pseudo-random frame sequence 1037 corresponding to the subsequent authentication period 1043 (i.e., ON-ON-ON-OFF). Likewise, the second subsequent authentication period 1045 can be configured to immediately follow the subsequent authentication period 1043. In the example of FIG. 11, the number of "ON" frames does not equal the number of "OFF" frames during the first authentication period 1041 and the subsequent authentication period 1043. The duration that each frame is displayed can be adjusted to account for this.

The second subsequent public encryption key 1046 can be used to securely exchange the synchronization parameters, including the pseudo-random frame sequence 1037 corresponding to the second subsequent authentication period 1045 (i.e., ON-OFF). The subsequent authentication period 1043 or the second subsequent authentication period 1045 can be configured to repeat for any number of frames, or any duration, according to the synchronization parameters used. In an example, the first authentication period 1041 can include six frames, the subsequent authentication period 1043 can include four frames, and the second subsequent authentication period 1045 can include two frames. In an example, each authentication period can be configured to display a frame sequence twice, such that the first authentication period 1041 can include twelve frames, the subsequent authentication period 1043 can include eight frames, and the second subsequent authentication period 1045 can include four frames.

In an example, the frame display duration 1047 can be adjusted to further enhance the security of the system 100. As previously mentioned, a frame display rate of 40 frames per second corresponds to an individual frame display duration of 0.025 seconds. By including the individual frame display duration in the variable synchronization parameters exchanged during each authentication period, the security of the system 100 can be enhanced.

In an example, a first frame display duration, e.g. 0.025 seconds, can be applied for each frame of the first authentication period 1041. A second frame display duration, such as 0.01 seconds, can be applied for each frame of the subsequent authentication period 1043. An unauthorized user would have to intercept the pseudo-random frame sequence 1037 and the information corresponding to the frame display duration 1047 to configure a device to enable a user to ascertain the private image.

In an example, each frame can correspond to a unique frame display duration 1047. For example, the first frame 1051 can correspond to a first frame display duration of 0.025 seconds. The second frame 1052 can correspond to a second frame display duration of 0.01 seconds. The third frame 1053 can correspond to a third frame display duration of 0.018 seconds. In an example, the frame display duration 1047 information can be exchanged between the viewing device 102 and the display device 101 as duration information, or the information can be indicated by exchanging frame boundary information, such as a frame start time and a frame stop time. The frame display duration 1047 and the displayed content sequence must be carefully chosen such that the private image 215 remains hidden from both a public viewer and a user of the viewing device 102 configured to apply the simple alternating frame sequence 1035.

In an example, the synchronization parameters can be exchanged between the display device 101 and the viewing device 102 using one or more transmission devices. For example, the authentication and exchange of synchronization parameters, including the pseudo-random frame sequence 1037, can occur via the communicative data coupling 104, such as using Bluetooth. In an example, frame boundary information, such as to designate the frame display duration 1047, can be exchanged using the communicative data coupling 104, such as using an infrared signal.

Figure 12:
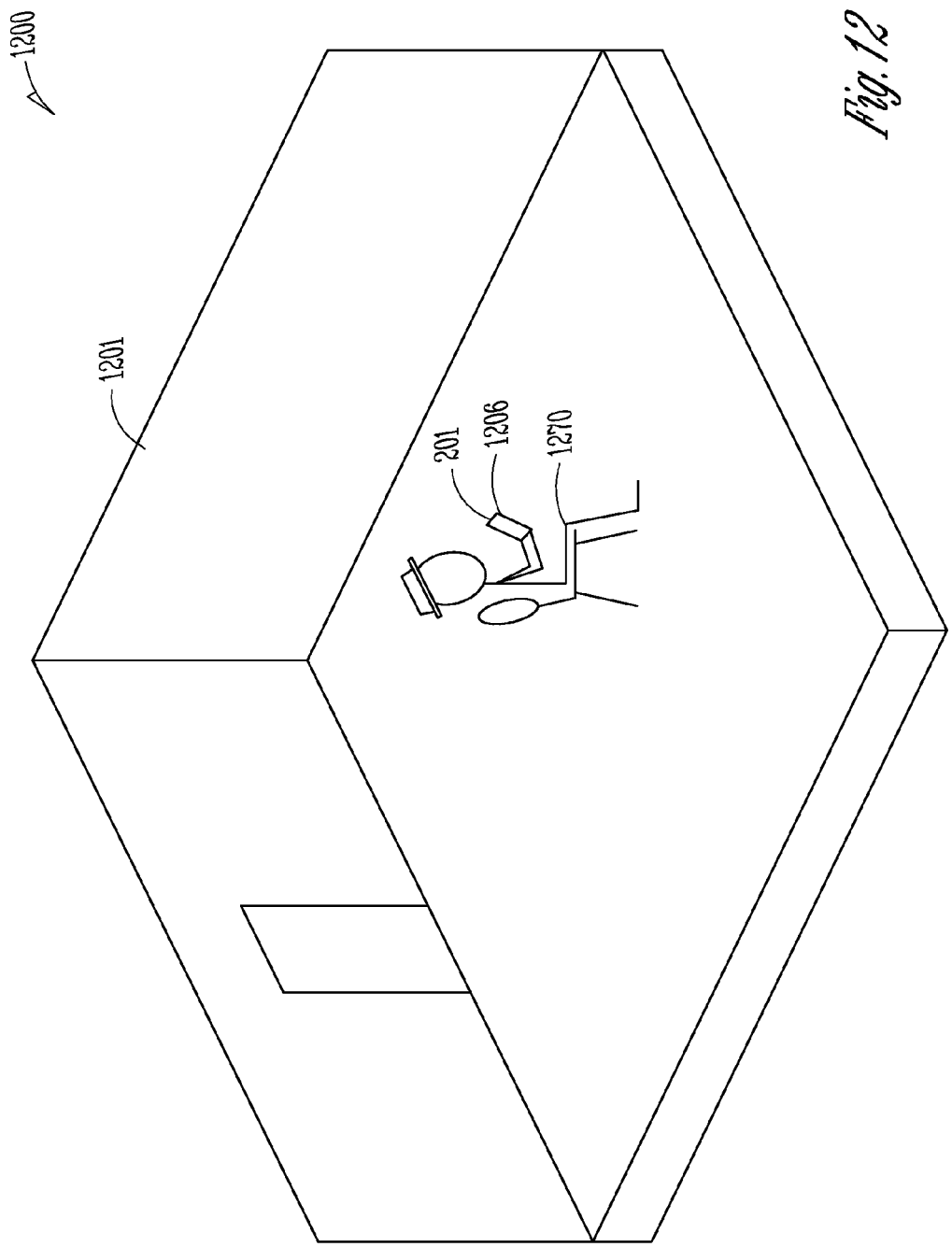
FIG. 12 illustrates generally an example that can include a mobile device configured with an environment parameter sensor according to one embodiment.
Figure 13:
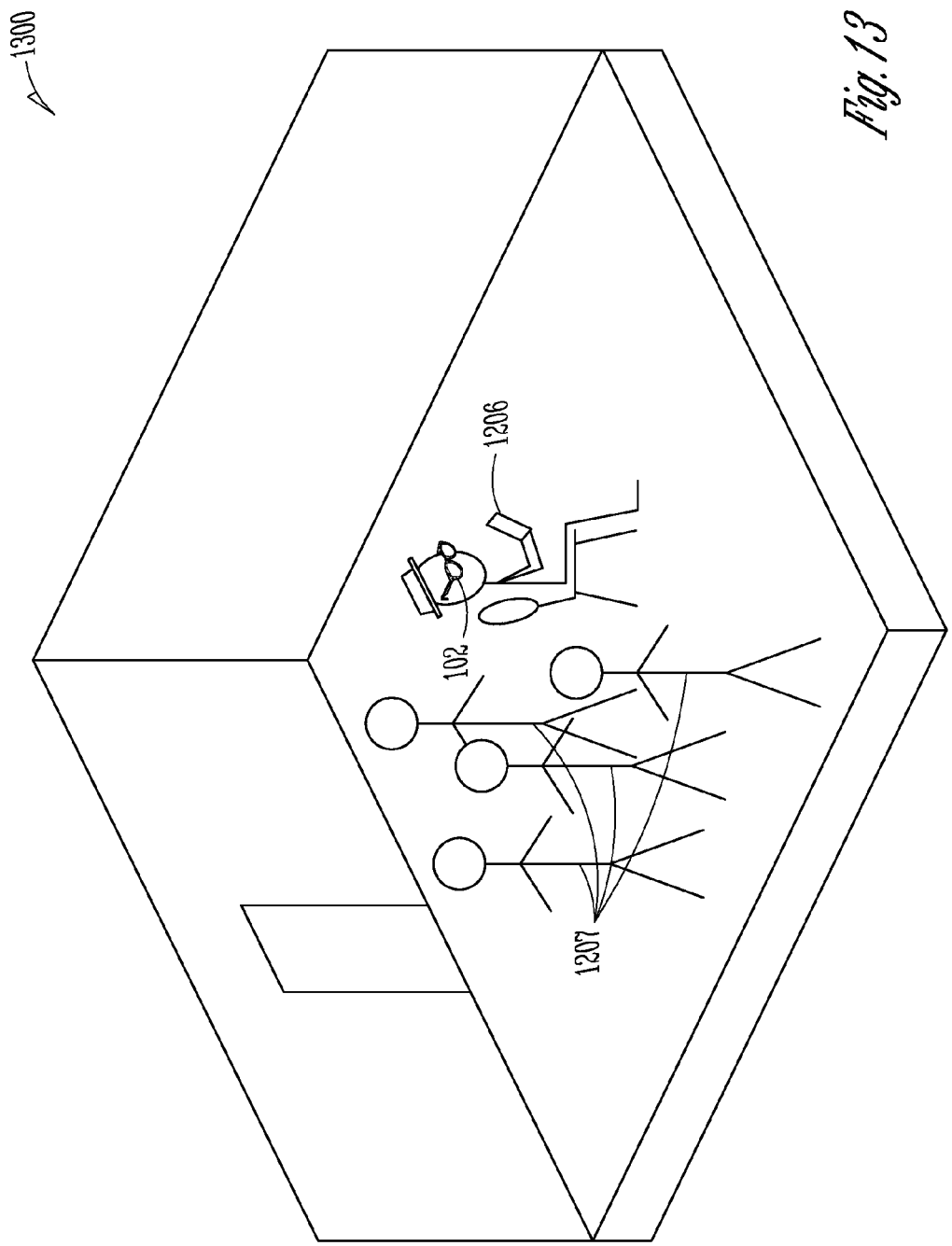
FIG. 13 illustrates generally an example that can include a mobile device configured with an environment parameter sensor according to one embodiment.
Figure 14:
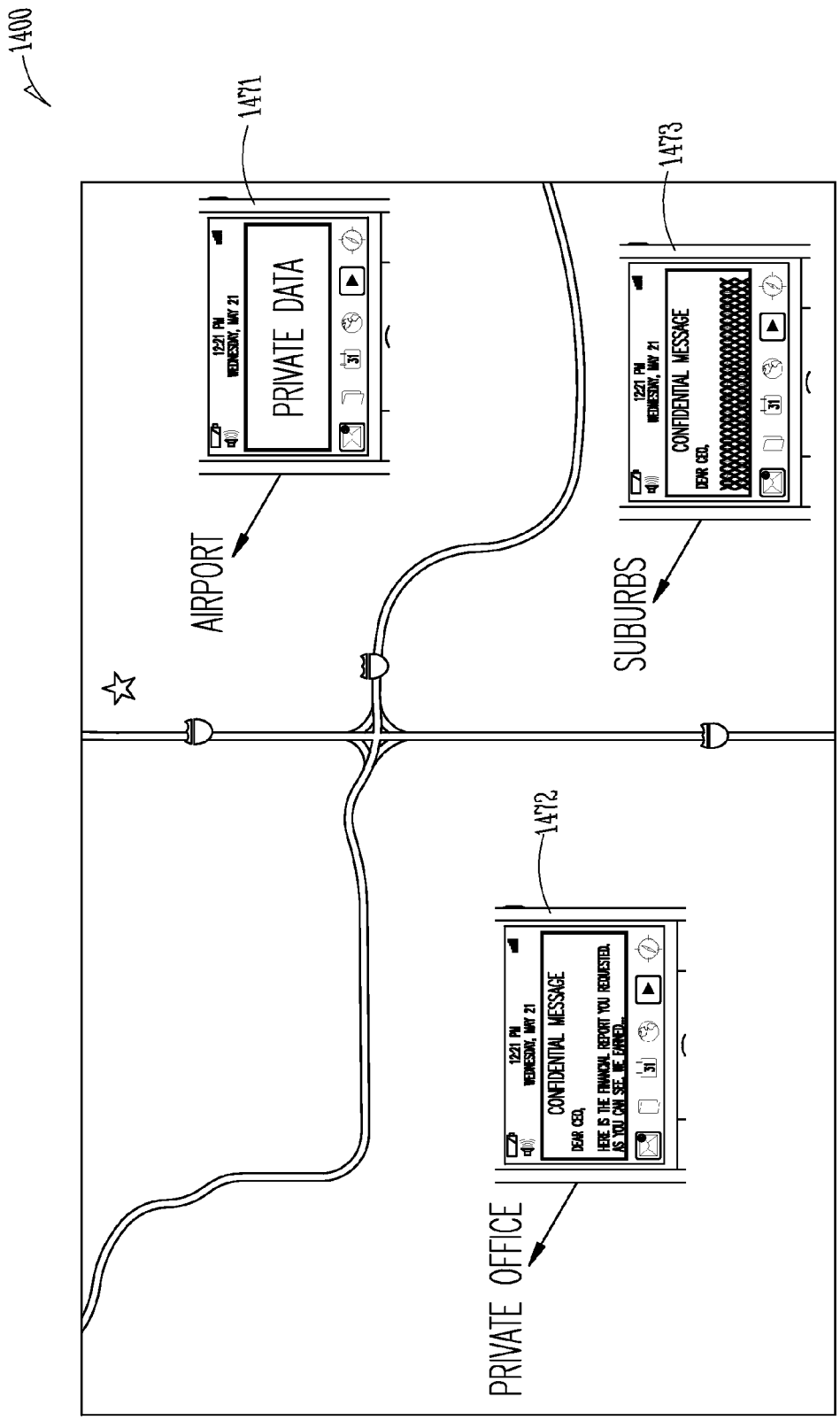
FIG. 14 illustrates generally an example that can include a mobile device configured with an environment parameter sensor according to one embodiment.

Examples for securely synchronizing the display device 101 and the viewing device 102 have been described in FIGS. 10 and 11. Alternative configurations, including multiple authentication intervals, can be implemented. FIGS. 12 through 14 are now directed to additional security enhancements for the secure display of private information using environmental sensors.

AFS Security Techniques using Environmental Parameters

FIGS. 12, 13, and 14 illustrate generally examples that can include a mobile device configured with an environment parameter sensor. FIG. 12 illustrates generally an example of a configuration 1200 that can include a mobile device in a first location. The configuration 1200 can include an environment 1201, the mobile device 201, a sensor 1206, or a user 1270.

In an example, the environment 1201 can include virtually any setting. The example of FIG. 12 shows a room, such as an empty office space. The environment 1201 could include, among other environments, a home, a roadway, or an airport. Indeed, the environment 1201 can be virtually any environment. The sensor 1206, such as can be included in the mobile device 201, can include any sensor capable of sensing an environment parameter. In an example, the sensor can include any sensor that can be communicatively coupled to the mobile device 201, such as to provide or supply information indicative of an environmental parameter to the mobile device 201.

In an example, the sensor 1206 can include a camera. The camera can be a front-mounted camera on the mobile device 201. The camera can be, among other things, a sensor capable of sensing light and dark, a sensor capable of recording color images, or a sensor capable of recording color, high definition video. The information sensed using the camera, such as including an image or series of images, can be made available to the mobile device 201.

In an example, the sensor 1206 can include a global positioning system (GPS) receiver. The GPS receiver can be, among other things, a sensor capable of receiving at least one signal from global positioning satellites. In an example, the GPS receiver can be configured to receive three or more signals such as to enable the mobile device 201 to calculate a geographical location, including latitude, longitude, and elevation, using triangulation of the three or more received signals.

In an example, the sensor 1206 can include a cellular telephone network receiver. The cellular telephone network receiver can be used to calculate a location using the known locations of cellular telephone network transmitters in communication with the sensor 1206.

In an example, the sensor 1206 can include one or more of a microphone, an accelerometer, a thermometer, or a wireless network receiver. The microphone can be configured to receive sound pressure information. The accelerometer can be configured to receive motion information, including acceleration or vibration. The thermometer can be configured to receive temperature information. The wireless network receiver can be configured to receive information indicative of a wireless network, such as a service set identifier (SSID). The examples of the sensor 1206 provided here are not meant to be an exhaustive list, but instead to illustrate a range of sensors capable of sensing a range of environmental parameters. Importantly, the sensor 1206 is one that can be configured to sense an environment parameter.

In the example of FIG. 12, the user 1270 can be engaged in the use of the mobile device 201. As the user 1270 attempts to view the private image 215, the mobile device 201 can be configured to decide how to display the private image, such as using AFS or not using AFS. To aid in this decision, the mobile device 201 can engage one or more of the sensors 1206 to receive information indicative of an environment parameter, such as information about the environment 1201. If the one or more environment parameters indicate a secure environment, the mobile device 201 can be configured to display the private image 215 without using AFS, such as on the display 205. If the environment parameter indicates an unsecure environment, the mobile device 201 can be configured to display the private image using AFS, such as to display the private image 215 in the first display region 211 of the display 205. If, however, the environment parameter indicates an environment that is intermediately secure, the mobile device 201 can be configured to display at least a portion of the private image using AFS.

In an example, the sensor 1206 can include a front-mounted camera configured to receive a digital image, or series of images, of the user 1270, such as in response to a user-initiated command. The image or series of images can include information indicative of an environment parameter. In an example, the mobile device 201 can receive the digital image of the user 1270, and, through processor-driven image analysis, assess if the user 1270 is an authorized user. In an example, further image analysis can assess if the authorized user is alone, or if others are attempting to look over the shoulder of the authorized user. In an example, the user 1270 can be determined to be an authorized user. Using the information that the user 1270 is an authorized user who is alone, the mobile device 201 can extract an environment parameter indicative of a secure environment, and apply a security policy commensurate with the secure environment. For example, the mobile device 201 can be configured to display the private image 215 without using AFS in a secure environment.

The analysis of images collected from the front-mounted camera can occur in real-time such that the private image 215 can be displayed without using AFS as long as the camera detects only the authorized user. In an example, as soon as an unauthorized or unrecognized entity appears in view of the front-mounted camera, the mobile device 201 can be configured to shield the private image 215, such as by removing the private image 215 from the display 205, or by displaying the private image 215 using AFS.

FIG. 13 illustrates generally the user 1270 now in the company of a nearby crowd 1207. Although the user 1270 can be recognized as an authorized user, the information indicative of an environment parameter received from the sensor 1206 can include information that the user 1270 is not alone, but in fact in the presence of the crowd 1207. In response to the new information that the authorized user is not alone, the mobile device 201 can be configured to shield the private image 215.

In an example, the mobile device 201 can include the sensor 1206 such as including a GPS receiver. The GPS receiver can be configured to receive GPS signals and calculate a location. The location information can include information indicative of an environment parameter. In an example, the mobile device 201 can receive the location information, and, through processor-driven analysis, assess if the mobile device 201 is located in an environment that is secure, unsecure, or intermediately secure.

FIG. 14 illustrates generally an example of several locations where the use or nonuse of AFS to display the private image 215 can be automatically indicated, such as using a received environment parameter. A public location, such as an airport, can be designated as an unsecure location. A rural area or location can be designated as a secure location. A suburban location can be designated as an intermediately secure location.

In an example, location information can be used to determine a security level such as by comparing a location to a predefined set of coordinates. The mobile device 201 can be configured to recognize a first geographical location that can be a secure location. In the example of FIG. 14, the first geographical location can be a GPS-identified secure location 1472, such as a private office in a residential area in Boca Raton, Fla. The mobile device 201 can be configured to display the private image 215 without using AFS in response to receiving the signal indicative of the GPS-identified secure location 1472.

The mobile device 201 can be configured to recognize a second geographical location that can be an unsecure location. In the example of FIG. 14, the second geographical location can be a GPS-identified unsecure location 1471, such as Palm Beach International Airport in West Palm Beach, Fla. The mobile device 201 can be configured to display the private image 215 using AFS in response to receiving the signal indicative of the GPS-identified unsecure location 1471.

The mobile device 201 can be configured to recognize a third geographical location that can be an intermediately secure location. In the example of FIG. 14, the third geographical location can be a GPS-identified intermediately secure location 1473, such as the Boca Raton Resort and Club in Boca Raton, Fla., or a suburban location. The mobile device 201 can be configured to display at least a portion of the private image 215 using AFS in response to receiving the signal indicative of the GPS-identified intermediately secure location 1473.

In an example, the first geographical location can include the GPS coordinates defining the area of an office building, such as including a company's headquarters. In an example, the mobile devices 201 used by employees of the company can be configured to display private information without using AFS whenever the mobile devices 201 are located within the headquarters office building. When an employee brings the mobile device 201 outside of headquarters, such as to a restaurant located in a second geographical location, the mobile device 201 can be configured to display private information using AFS. In an example, the third geographical location can be predefined to be an intermediately secure location. When the employee is located in the third geographical location and attempts to view private information using the mobile device 201, the mobile device 201 can be configured to display a portion of the private information using AFS, such as to display information assigned an intermediate level of security. For example, the header information including the subject of an encrypted email can be displayed in the second display region 221 without using AFS, while the content of the encrypted email can be displayed in the first display region 211 using AFS.

FIGS. 2 through 14 have illustrated several examples describing the use of AFS to display private information, and have further illustrated techniques to ensure that only an authorized user is permitted to ascertain the private information. FIGS. 15 through 18 are directed to describing the system 100, such as including one or any combination of the examples discussed above, and further including having more than one authorized viewer.

AFS Systems for Multiple Viewers and Multiple Clearance Levels

Figure 15:
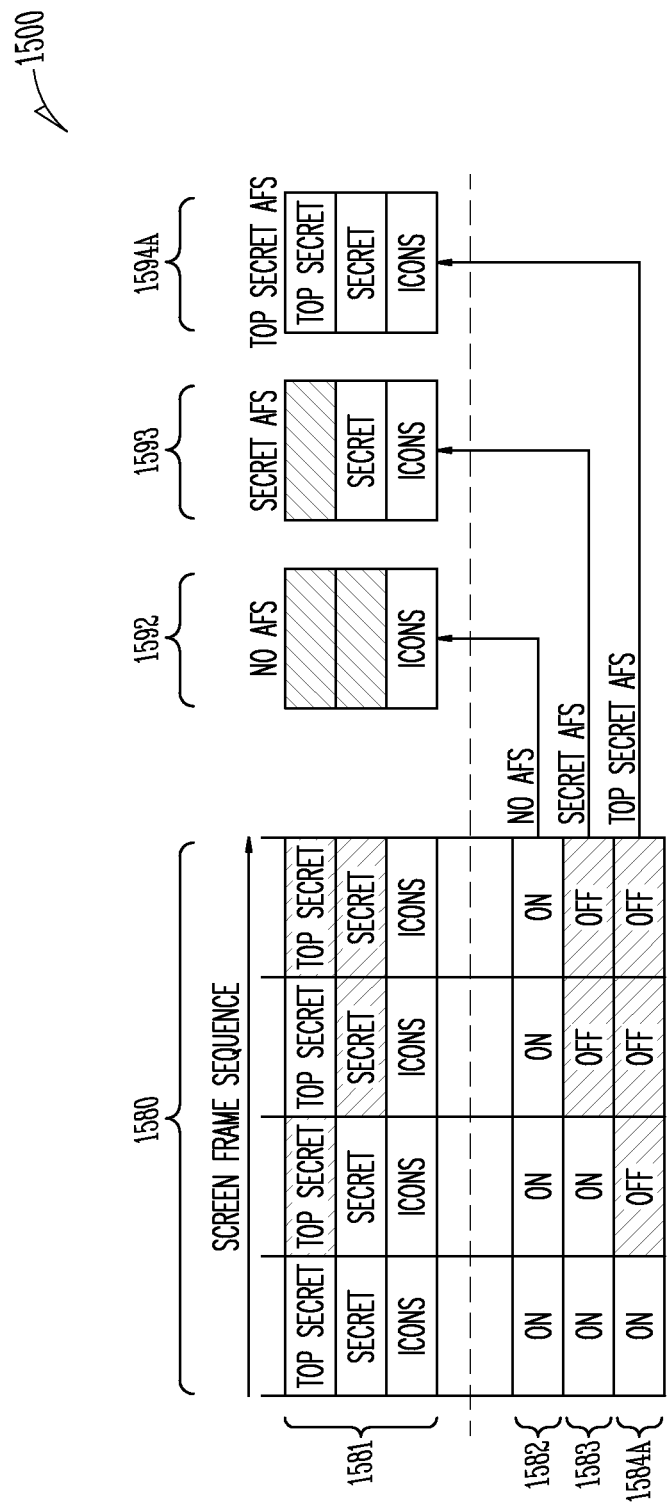
FIG. 15 illustrates generally an example that can include simultaneously displaying different information to multiple viewers of a single display according to one embodiment.

FIGS. 15, 16, 17, and 18 illustrate generally examples that can include simultaneously displaying different information to multiple viewers of a single display. FIG. 15 illustrates generally an example of an AFS implementation 1500. The AFS implementation 1500 can include a displayed content sequence 1580, screen content 1581, a frame sequence corresponding to the nonuse of a viewing device 1582, a first frame sequence corresponding to a first clearance level 1584A, a second frame sequence corresponding to a second clearance level 1583, a perceived display corresponding to nonuse of a viewing device 1592, an ascertained display corresponding to a first clearance level 1594A, or an ascertained display corresponding to a second clearance level 1593.

The screen content 1581 can include the information to be displayed concurrently, on a single display screen area, to one or more individuals. In an example, the screen content 1581 can include public information, such as "ICONS," or private information. The private information can include two or more levels of private information, such as "TOP SECRET" information and "SECRET" information, each of the two or more levels of private information corresponding to a clearance level that can be associated with an individual viewing device 102. For example, a first viewing device 102 can be associated with a first clearance level such that the first viewing device 102 can permit viewing the public information and the private information. A second viewing device 102 can be associated with a second clearance level such that the second viewing device 102 can permit viewing the public information in addition to at least a portion of the private information, wherein the private information includes the "SECRET" information. Importantly, the public information and the private information, including the "TOP SECRET" and "SECRET" information, can be displayed concurrently on a single display screen.

The displayed content sequence 1580 can include a series of frames. Each frame in the series can include content intended to be ascertained by users of one or more viewing devices 102. The ascertained image can depend on the clearance level associated with each viewing device 102.

In an example, the perceived display corresponding to nonuse of a viewing device 1592, the ascertained display corresponding to a first clearance level 1594A, and the ascertained display corresponding to a second clearance level 1593, can each represent viewable content that can be distinguished depending on which viewing device 102 is used. In an example, if the viewing device 102 is configured to use synchronization parameters including the first frame sequence corresponding to the use of an AFS viewing device configured to provide viewing at a first clearance level 1584A, the viewing device 102 can enable a viewer to view the ascertained display corresponding to a first clearance level 1594A. Similarly, if the viewing device 102 is configured to use synchronization parameters including the second frame sequence corresponding to a second clearance level 1583, the viewing device 102 can enable a viewer to view the ascertained display corresponding to a second clearance level 1593.

In an example, the perceived display corresponding to nonuse of a viewing device 1592 can indicate the information that can be viewed by a viewer not using an AFS viewing device (e.g., without the use of LC shutter glasses synchronized with the display device 101). The nonuse of an AFS viewing device can be the same as using an AFS viewing device configured to operate in a transparent lens state, as previously described. In a top portion of the display 205 where "TOP SECRET" information can be displayed, such as in the example of FIG. 15, the perceived display corresponding to nonuse of a viewing device 1592 can include a substantially featureless gray image. In the middle portion of the display 205 where "SECRET" information can be displayed, the perceived display corresponding to nonuse of a viewing device 1592 can include a substantially featureless gray image. In the bottom portion of the display 205 where "ICONS" are displayed, the perceived display corresponding to nonuse of a viewing device 1592 can include a public "ICONS" image. Thus, the frame sequence corresponding to the nonuse of a viewing device 1582 (i.e., without AFS) enables a public viewer to view only the public information, or "ICONS."

In an example, the ascertained display corresponding to a first clearance level 1594A can indicate the information that can be viewed by a viewer using an AFS viewing device configured with the synchronization parameters associated with a "TOP SECRET," or first, clearance level. The user of such a device authorized with the first clearance level can ascertain the private information, including the "TOP SECRET" information in the top portion of the display 205 and the "SECRET" information in the middle portion of the display 205, and can ascertain the public information, including the "ICONS," in the bottom portion of the display 205. Thus, the first frame sequence corresponding to a first clearance level 1584A can enable an authorized viewer to view the private information and the public information.

In an example, the ascertained display corresponding to a second clearance level 1593 can indicate the information that can be viewed by a viewer using an AFS viewing device configured with the synchronization parameters associated with a "SECRET," or second, clearance level. The user of such a device, authorized with the second clearance level, can ascertain the public information including the "ICONS" in the bottom portion of the screen, and the private information including the "SECRET" information in the middle portion of the display 205. The user can be precluded from viewing the "TOP SECRET" information in the top portion of the display 205. Thus, the second frame sequence corresponding to a second clearance level 1583 can enable an authorized viewer to view the public information and at least a portion of the private information.

Figure 16:
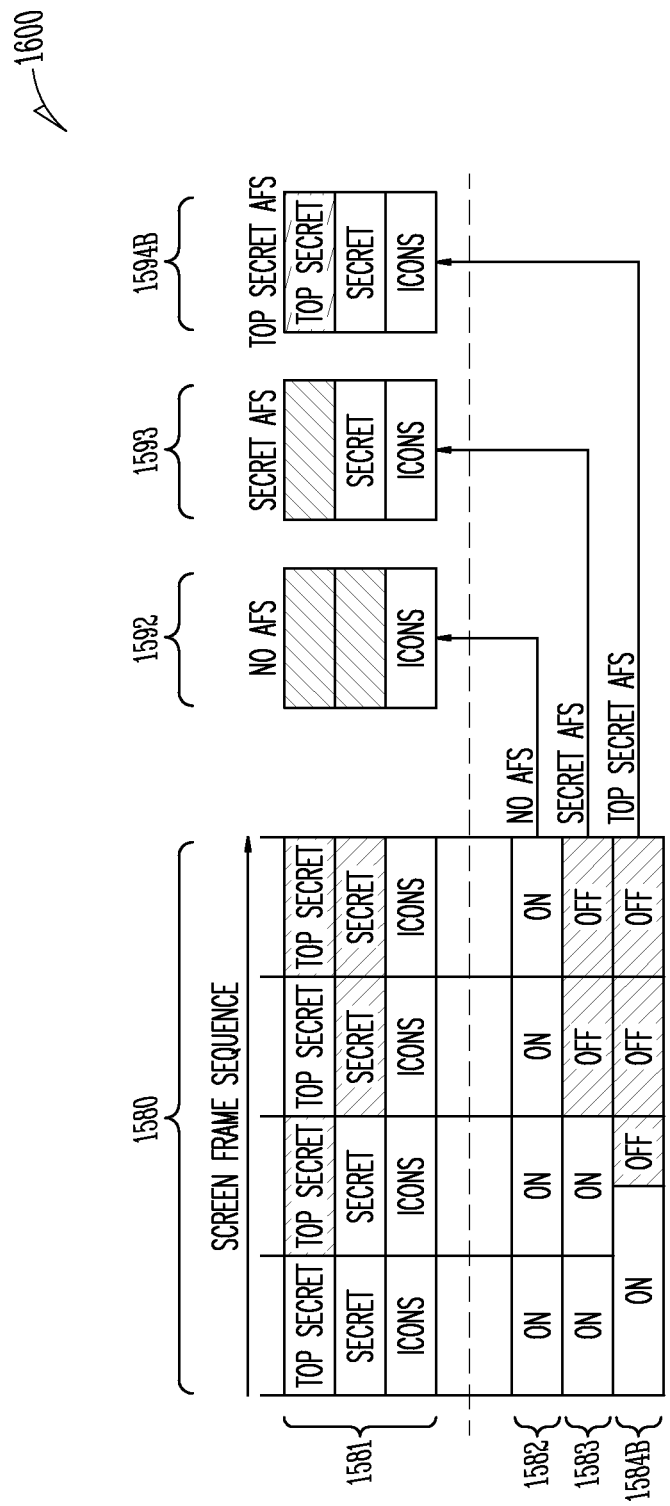
FIG. 16 illustrates generally an example that can include simultaneously displaying different information to multiple viewers of a single display according to one embodiment.

FIG. 16 illustrates generally an example of an AFS implementation 1600 that can be a variation of the AFS implementation 1500. The AFS implementation 1600 can include a perceived display corresponding to a first clearance level 1594B, and a frame sequence corresponding to a first clearance level 1584B.

In an example, the frame sequence corresponding to a first clearance level 1584B can include making visible to the viewer with the first clearance level a full frame including the "TOP SECRET" information and a portion of a frame including the inverse "TOP SECRET" information. Thus, the perceived display corresponding to a first clearance level 1594B can enable an authorized viewer to view the public information and the private information. The private information can include the "SECRET" information in the middle portion of the display 205, and can include the "TOP SECRET" information in the top portion of the display 205. The "TOP SECRET" information can appear visually distinguishable from the "SECRET" information because of the visual summation of a full frame of the "TOP SECRET" information with a half frame of the inverse "TOP SECRET" information.

Figure 17:
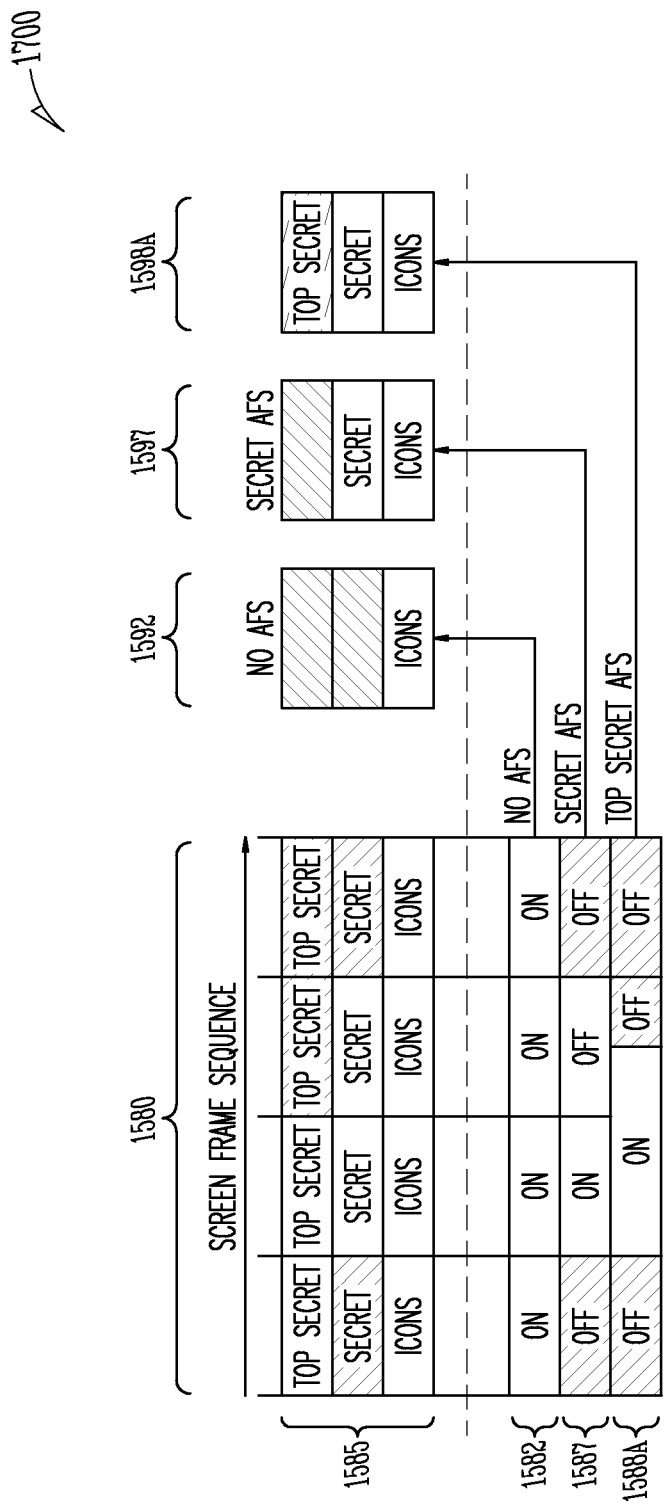
FIG. 17 illustrates generally an example that can include simultaneously displaying different information to multiple viewers of a single display according to one embodiment.

FIG. 17 illustrates generally an example of an AFS implementation 1700 that can achieve the same display effect as the AFS implementation 1600 using a different screen content pattern and different AFS frame sequence. In an example, the AFS implementation 1700 can include screen content 1585, a perceived display corresponding to a first clearance level 1598A, a frame sequence corresponding to a first clearance level 1588A, a perceived display corresponding to a second clearance level 1597, and a frame sequence corresponding to a second clearance level 1587.

In an example, the frame sequence corresponding to a first clearance level 1588A can include making visible to the viewer with the first clearance level a full frame including the "TOP SECRET" information and a portion of a frame including the inverse "TOP SECRET" information. Thus, the perceived display corresponding to a first clearance level 1598A can enable an authorized viewer to view the public information and the private information. The private information can include the "SECRET" information in the middle portion of the display 205, and can include the "TOP SECRET" information in the top portion of the display 205. The "TOP SECRET" information can be visually distinguishable from the "SECRET" information, such as by appearing in an intermediate or washed out state of clarity.

Figure 18:
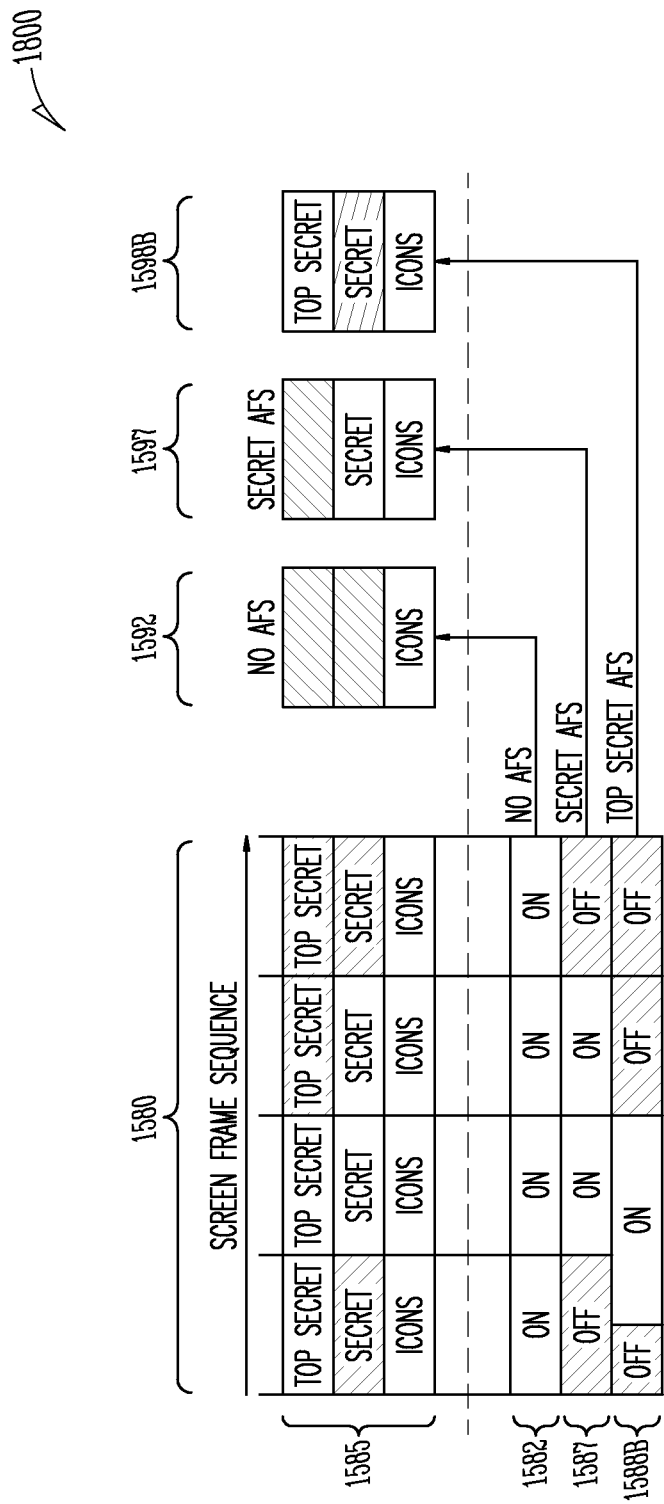
FIG. 18 illustrates generally an example that can include simultaneously displaying different information to multiple viewers of a single display according to one embodiment.

FIG. 18 illustrates generally an example of an AFS implementation 1800 that can be a variation of the AFS implementation 1700. The AFS implementation 1800 can include a perceived display corresponding to a first clearance level 1598B, and a frame sequence corresponding to a first clearance level 1588B.

In an example, the frame sequence corresponding to a first clearance level 1588B can include making visible to a viewer with the first clearance level a full frame including the "SECRET" information and a portion of a frame including the inverse "SECRET" information. The "SECRET" information can appear visually distinguishable from the "TOP SECRET" information because of a visual summation of a full frame of the "SECRET" information with a half frame of the inverse "SECRET" information. Thus, the perceived display corresponding to a first clearance level 1598B can enable an authorized viewer to view the public information and the private information. The private information can include the "TOP SECRET" information in the top portion of the display 205, and can include the "SECRET" information in the middle portion of the display 205. The "SECRET" information can be visually distinguishable from the "TOP SECRET" information.

In an example, a user can elect to use the viewing device 102 such that the user can ascertain the "TOP SECRET" information in a manner visually distinguishable from the "SECRET" information. As presented here, the feature incorporating the visual distinction between information can involve a change in frame display duration at the viewing device 102. Thus, this feature can be turned on or off such as using a switch on the viewing device 102. However, the feature can be similarly implemented at the display device.

In an example, the displayed content sequence 1580, or the shutter sequence employed by the viewing device 102, can be configured such that the "TOP SECRET" and "SECRET" information can be visually distinguished in a manner that does not rely on the visual summation of a first frame and the inverse of the first frame. For example, the "TOP SECRET" or "SECRET" information can be visually distinguished such as by a flashing or flickering of the information displayed in those portions of the display. In an example, the "TOP SECRET" information can be configured to alternately display for one second, and then to display as substantially featureless for a subsequent second.

Figure 19:
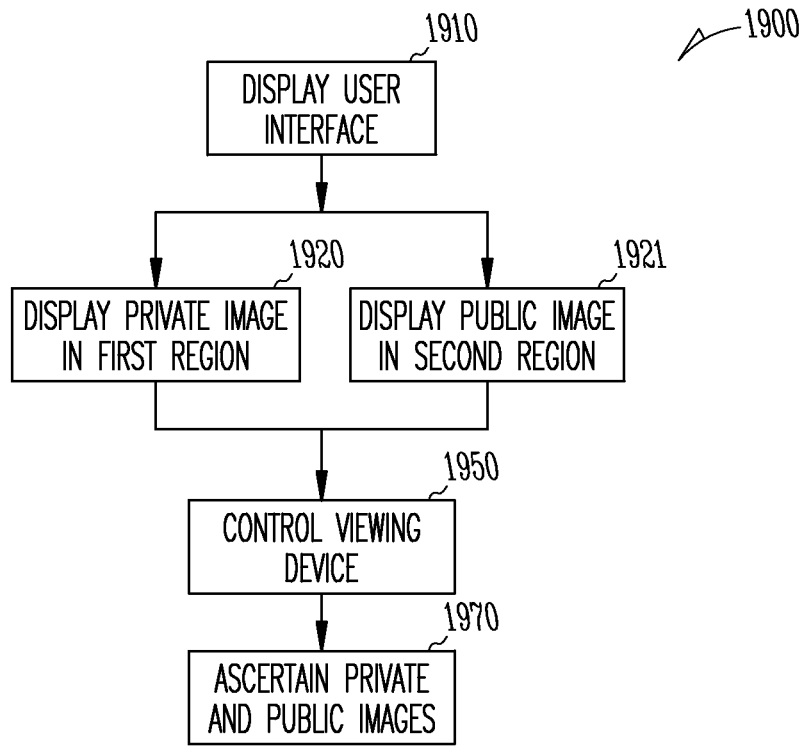
FIG. 19 illustrates generally an example that can include displaying private and public images using multiple user interface display regions according to one embodiment.

FIGS. 15 through 18 describe examples of several AFS implementations that can enable viewing several types of information concurrently on a single display. The examples describe AFS implementations that can permit those with higher clearance levels to ascertain portions of the display that may be precluded from the view of those with lower clearance levels. Other examples include providing an indication, to those with higher clearance levels, of information precluded from the view of those with lower clearance levels.
Methods and Systems of AFS Implementations FIG. 19 illustrates generally an example that can include displaying private and public images using multiple user interface display regions. For example, FIG. 19 illustrates generally an example 1900 that can include displaying a user interface 1910, displaying a private image in a first region 1920, displaying a public image in a second region 1921, controlling a viewing device 1950, and ascertaining private and public images.

At 1910, a user interface can be displayed. The user interface can be implemented in the mobile device 201. The user interface can be configured to accept user input, such as via a touch screen, keyboard, mouse, microphone, or other auxiliary input device. The user interface can be configured to present information to a user, such as using an LCD display screen, a speaker, or some other output device. In an example, the user interface can include an active shutter lens, such as can be configured in ON and OFF states to permit or preclude a user of the lens from viewing a display.

At 1920, a private image can be displayed in a first region. For example, the private image can be displayed in a first region of the display screen of the user interface. In an example, the private image can include sensitive information that a user wishes prevent unauthorized viewers from viewing on the display screen. The first region can be a region of any size or shape that the display is capable of rendering. The private image displayed in the first region can be displayed using alternate frame sequencing.

At 1921, a public image can be displayed in a second region. For example, the public image can be displayed in a second region of the display screen of the user interface. In an example, the public image can include any information that a user does not wish to conceal from the view of an unauthorized on-looker. The public image can include user interface information, such as can be used for navigation of a mobile device. In an example, icons used to initiate computer programs can be public images, while the working or active area of a particular computer program can be private. The second region can be a region of any size or shape that the display is capable of rendering. The public image displayed in the second region can be displayed, for example, without using alternate frame sequencing.

At 1950, a viewing device can be controlled. For example, the viewing device can be an active shutter lens. In an example, the user interface displayed at 1910 can be configured to display a private image in a first region at 1920 using alternate frame sequencing. To enable a user to ascertain the private image, a viewer can use a viewing device controlled in such a manner as to enter a transparent state while the private image is displayed in the first region, and to enter an opaque state while a scrambling image is displayed in the first region. At 1950, the viewing device can be controlled such that the user of the viewing device is precluded from viewing the visual summation of the private image and the scrambling image, such as to permit the authorized user to view only the private image.

At 1970, private and public images can be ascertained. In an example, one or more private images can be ascertained when viewed with a viewing device that is synchronized to the display device. When viewed without a properly controlled viewing device, the public image can be perceived, and the display regions configured to display the private image can be perceived as substantially featureless regions on the display.

Figure 20:
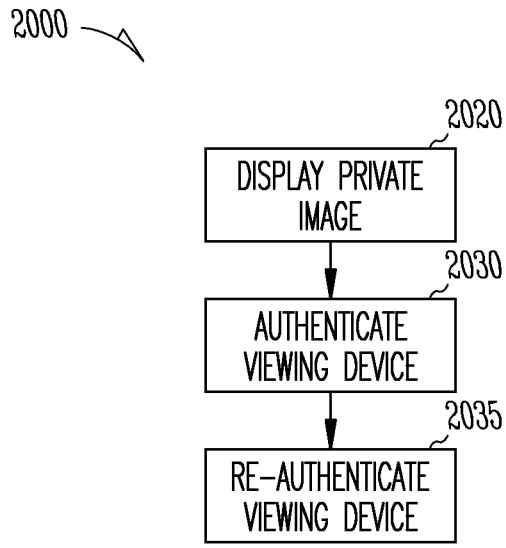
FIG. 20 illustrates generally an example that can include displaying a private image and authenticating a viewing device according to one embodiment.

FIG. 20 illustrates generally an example that can include displaying a private image and authenticating a viewing device. FIG. 20 includes an example 2000 that can include displaying a private image 2020, authenticating a viewing device 2030, and re-authenticating the viewing device 2035.

At 2020, a private image can be displayed. For example, the private image can be displayed in a first region of the display screen. In an example, the private image can include confidential information that a user wishes to keep hidden from the view of an unauthorized user. The private image can be displayed using alternate frame sequencing.

At 2030, a viewing device can be authenticated. In an example, the viewing device can be used to ascertain the private image. The viewing device can be authenticated such as by exchanging a handshaking code between the viewing device 102 and the display device 101. In an example, the authentication can include the exchange of one or more public encryption keys, such as a rotating public encryption key, or one or more messages encrypted using public or private key cryptography. In an example, the display device 101 can be configured to provide a public encryption key to the viewing device 102. The viewing device 102 can be configured to respond by providing a message, including a first set of synchronization parameters, encrypted using the public encryption key.

At 2035, the viewing device can be re-authenticated. In an example, the viewing device can be used to ascertain the private image 215 for a first authorized duration, or a first number of frames displayed. Ascertaining the private image for a subsequent duration or number of frames can be authorized such as by performing a re-authentication of the viewing device 102 and the display device 101. In an example, re-authenticating the viewing device 102 at 2035 can include exchanging one or more messages using public key cryptography.

In an example, re-authenticating the viewing device 102 at 2035 can include reestablishing credentials that were established at the initial viewing device authentication 2030. For example, a first authentication can establish a secret number, such as "0001," an increment, such as "+2," and a duration, such as 30 seconds. In this example, the re-authentication can occur every 30 seconds. Instead of, or in addition to, the exchange of encrypted information, the re-authentication can use the secret number or increment to implement a frame display pattern associated with the secret number or increment. For example, after the first 30 seconds, each device can use the secret number 0001+2=0003. In an example, 0003 can correspond to a frame display duration (e.g., 0.013 seconds), or can correspond to a frame display sequence (e.g., ON-ON-ON-OFF-OFF-OFF). After one minute has elapsed, each device can use the secret number 0001+2+2=0005. In an example, 0005 can correspond to a different frame display duration (e.g., 0.015 seconds), or can correspond to a different frame display sequence (e.g., ON-ON-ON-ON-ON-OFF-OFF-OFF-OFF-OFF). The frame display duration and the frame display sequence associated with each secret number can be assigned arbitrarily as long as the display device 101 and the viewing device 102 can contemporaneously be configured with the same duration and sequence parameters.

Figure 21:
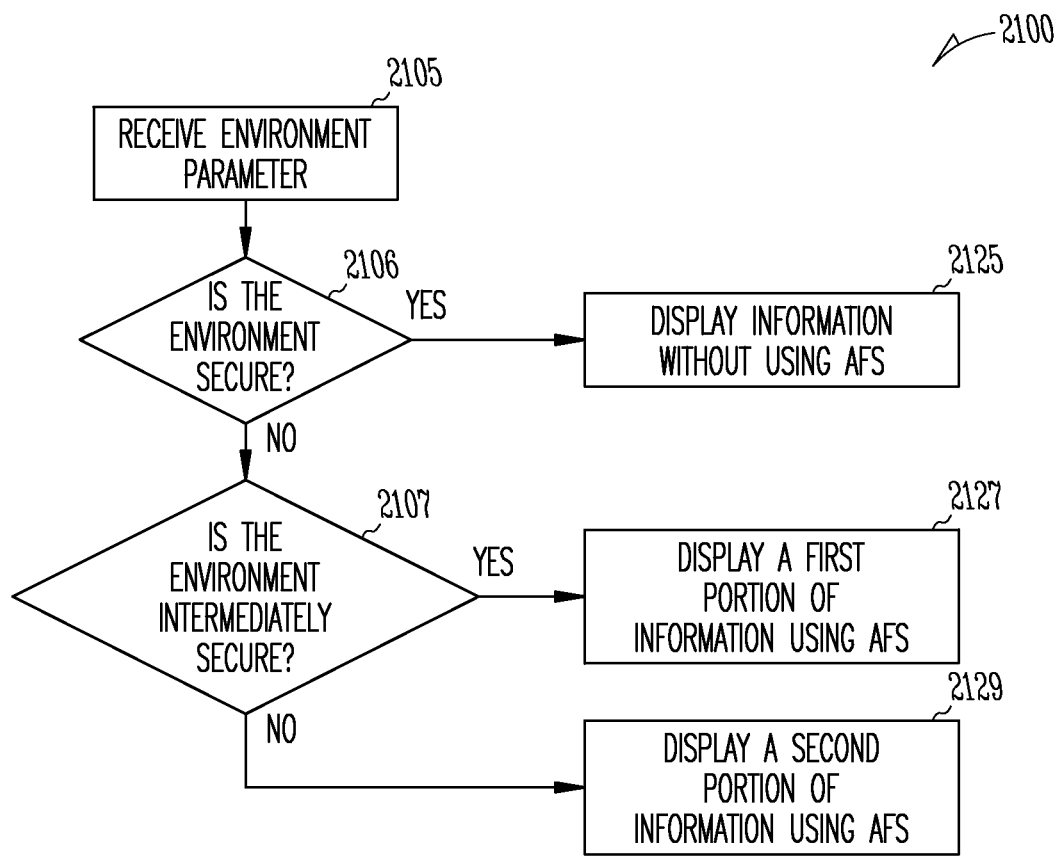
FIG. 21 illustrates generally an example that can include receiving an environment parameter and displaying information according to one embodiment.

FIG. 21 illustrates generally an example that can include receiving an environment parameter and displaying information. An example 2100 can include receiving an environment parameter 2105, and analyzing a security level associated with the environment parameter. The environment parameter can be analyzed to determine if the environment parameter indicates a secure environment 2106. If a secure environment is indicated, information can be displayed without using AFS, such as at 2125. If the environment parameter does not indicate a secure environment, the environment parameter can be analyzed to determine if the environment parameter indicates an intermediately secure environment 2107. If an intermediately secure environment is indicated, a first portion of information can be displayed using AFS, such as at 2127. If the environment parameter does not indicate an intermediately secure environment, a second portion of information can be displayed using AFS 2129.

At 2105, an environment parameter can be received. In an example, the sensor 106 can be used to receive one or more environment parameters. The sensor 106 can be any type of sensor configured to receive information about an environment or a location. For example, the sensor 106 can include a camera. At 2105, receiving an environment parameter can include receiving an image from the camera. The sensor 106 can include a microphone. At 2105, receiving an environment parameter can include receiving sound pressure level information from the microphone.

At 2106, the received environment parameter can be analyzed. In an example, the environment parameter can be compared to a previously defined threshold parameter, or the security level of the environment can be devised or calculated. In an example, several environmental parameters, including an image and a sound pressure level, received from a camera and a microphone respectively, can be analyzed. A processor-defined algorithm can analyze the image to determine if an authorized viewer is detected within the camera's field of view. The algorithm can analyze the sound pressure level to determine if the display device 101, such as can be coupled to the sensor 106, is located in a noisy environment. In an example, only the authorized viewer is detected, and the sound pressure level is below a minimum noise level threshold. In such an example, the environment can be determined to be secure. In an example, only the authorized viewer can be detected, but the sound pressure level is above a minimum noise level threshold. In such an example, the environment can be determined to be unsecure or intermediately secure.

At 2107, the received environment parameter can be further analyzed. In an example, the environment parameter can be compared to a previously defined threshold parameter, or the security level of the environment can be devised or calculated. For example, the environment parameters associated with the camera and microphone can be analyzed to determine if the environment is intermediately secure. In an example, only the authorized viewer can be detected, and the sound pressure level is below a minimum noise level threshold, and a GPS receiver indicates that the display device 101 is in a location that is not associated with any particular security level. In such an example, the environment can be determined to be intermediately secure. In an example, the GPS receiver indicates that the display device 101 is in a location that is unsecure. In such an example, the environment can be determined to be unsecure.

At 2125, in response to a determination at 2106 that the environment is secure, information can be displayed without using AFS. In an example, the private image 215 can be displayed without using AFS.

At 2127, in response to a determination at 2107 that the environment is intermediately secure, a first portion of information can be displayed using AFS. In an example, the first portion of information can include header information in an email message.

At 2129, in response to a determination at 2107 that the environment is not intermediately secure, a second portion of information can be displayed using AFS. In an example, the second portion of information can include all information displayed in an email program, such as including header information for email messages. In an example, the second portion can include more information configured for display using AFS at 2129 than can be included in the first portion at 2127. In an example, email header information can be excluded from the first portion, but included in the second portion.

Figure 22:
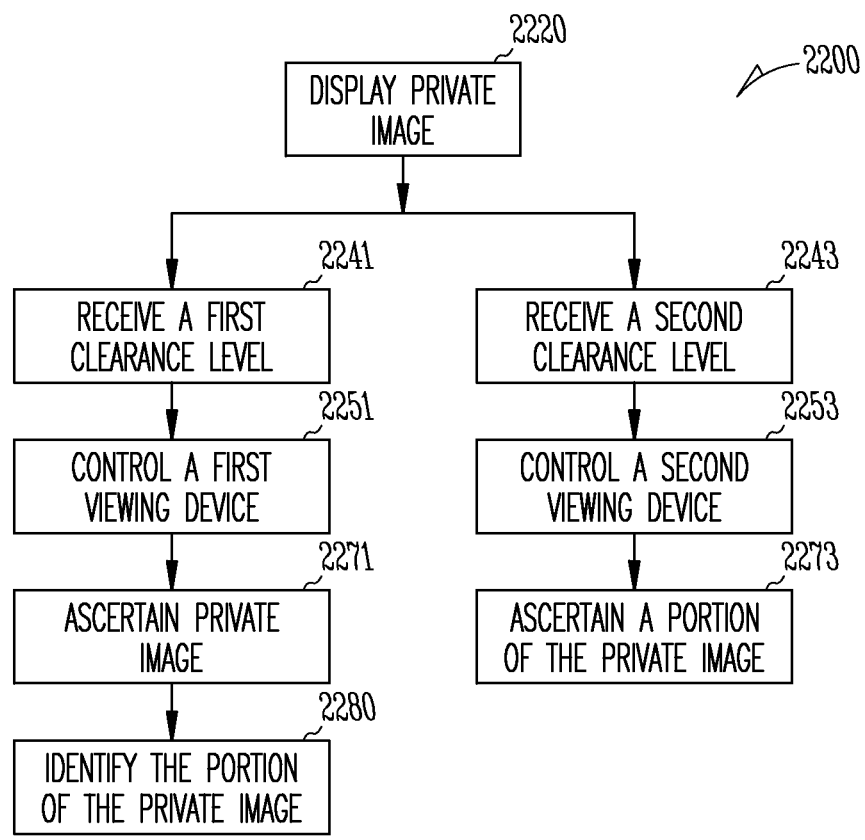
FIG. 22 illustrates generally an example that can include controlling multiple viewing devices using clearance level information according to one embodiment.

FIG. 22 illustrates generally an example that can include controlling multiple viewing devices using clearance level information. In the example of FIG. 22, an example 2200 can include displaying a private image 2220, receiving a first clearance level 2241, and receiving a second clearance level 2243. In response to receiving the second clearance level at 2243, the example 2200 can include controlling a second viewing device 2253, and ascertaining a portion of the private image. In response to receiving the first clearance level at 2241, the example 2200 can include controlling a first viewing device 2251, ascertaining a private image 2271, and identifying the portion of the private image 2280.

At 2241, a first clearance level can be received. The clearance level can be used to determine one or more synchronization parameters to permit viewing all or a portion of the display 205. In an example, the first clearance level can be received by the viewing device 102. For example, the first clearance level can indicate a highest clearance level, such as a TOP SECRET clearance level.

At 2243, a second clearance level can be received. In an example, the second clearance level can be received by the display device 101. In an example, the second clearance level can indicate an intermediate clearance level, such as a SECRET clearance level.

At 2251, a first viewing device can be controlled. The first clearance level, such as received at 2241, can be used at least in part to determine how the first viewing device can be controlled. For example, in response to receiving a TOP SECRET clearance level, the first viewing device can be controlled according to a first synchronization parameter. In response to receiving a SECRET clearance level, the first viewing device can be controlled according to a second synchronization parameter.

At 2253, a second viewing device can be controlled. The second clearance level, such as received at 2243, can be used at least in part to determine how the second viewing device can be controlled.

At 2271, the private image can be ascertained, such as using the viewing device 102. To ascertain the private image at 2271, the viewing device 102 can be controlled at 2251 in response to receiving the first clearance level at 2241.

At 2273, a portion of the private image can be ascertained, such as using the viewing device 102. To ascertain the portion of the private image at 2273, the viewing device 102 can be controlled at 2253 in response to receiving the second clearance level at 2243.

At 2280, an identification can be provided to a viewer with a highest clearance level to indicate the one or more portions of the private image precluded from the view of those with lower clearance levels. For example, a first viewer, who can have a highest clearance level, can be permitted to ascertain all items displayed on a display using AFS. The first viewer can also receive, using AFS, an indication of the one or more portions of the private image that are ascertainable only by the first viewer. For example, a display can be configured to present TOP SECRET, SECRET, and PUBLIC information. In an example, the first viewer with a highest clearance level can view all three categories of information. A second viewer can be precluded from viewing the TOP SECRET information, but can be permitted to ascertain a redacted portion or information including the SECRET and PUBLIC information. A visual indication can be provided to the first viewer to indicate the TOP SECRET information. For example, the TOP SECRET information can be displayed in grayscale, or can be configured to appear in a flashing or blinking manner. In an example, the SECRET information can be displayed in grayscale, or can be configured to appear in a flashing or blinking manner. In any case, the first viewer, such as with the highest security clearance level, can visually distinguish the TOP SECRET information from the SECRET information.

Figure 23:
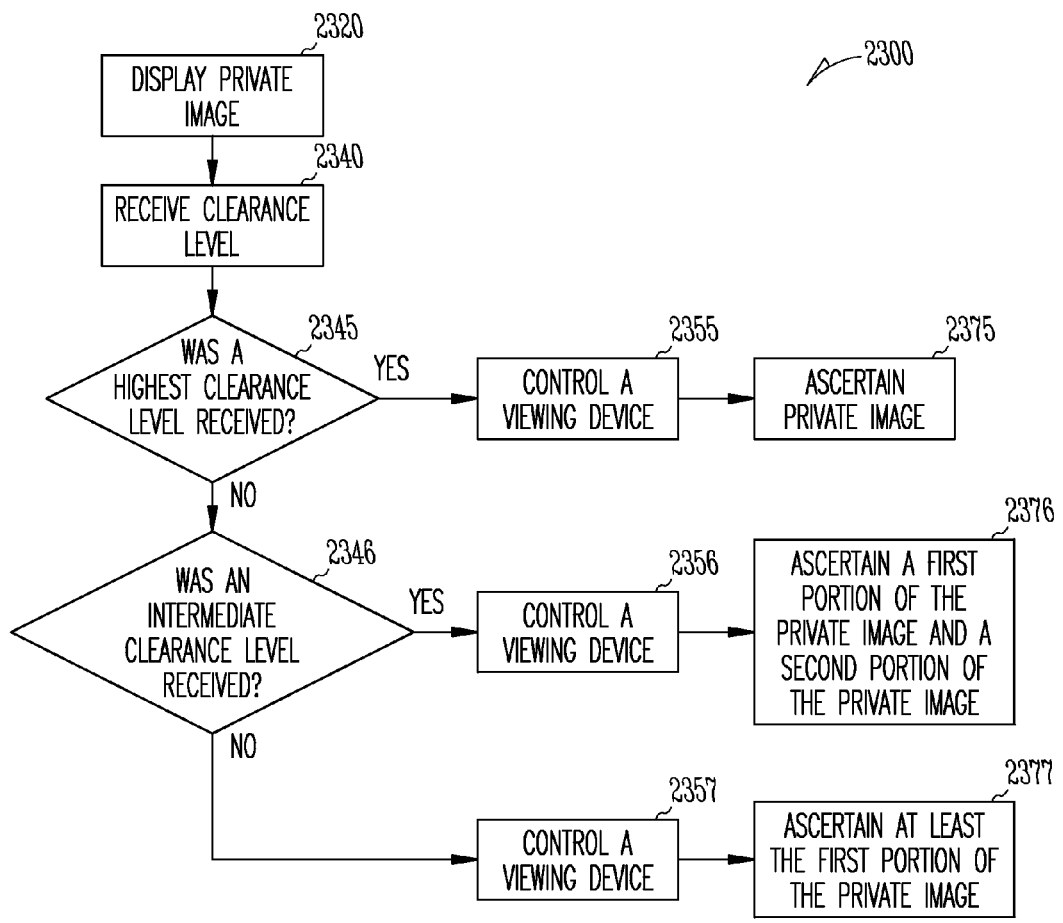
FIG. 23 illustrates generally an example that can include controlling a viewing device using clearance level information according to one embodiment.

FIG. 23 illustrates generally an example that can include controlling a viewing device using clearance level information. For example, FIG. 23 illustrates generally an example 2300 that can include displaying a private image 2320, and receiving a clearance level 2340. The clearance level received at 2340 can be analyzed at 2345 to determine if a highest clearance level was received. If a highest clearance level was received at 2340, the example 2300 can include controlling a viewing device 2355 and ascertaining a private image 2375. If a highest clearance level was not received at 2340, the clearance level can be further analyzed at 2346 to determine if an intermediate clearance level was received. If an intermediate clearance level was received at 2340, the example 2300 can include controlling a viewing device 2356 and ascertaining a first portion of the private image and a second portion of the private image 2376. If an intermediate clearance level was not received at 2340, the example 2300 can include controlling a viewing device 2357 and ascertaining at least the first portion of the private image 2377.

At 2320, a private image can be displayed, such as using the display 205 configured to display information using AFS. At 2340, a clearance level can be received. The clearance level can be received by the viewing device 102, the display device 101, or an intermediate device configured to enable the synchronization of the viewing device 102 and the display device 101. At 2345, the clearance level can be analyzed. The clearance level can be analyzed to determine if a highest clearance level was received. For example, the clearance level can be analyzed by a processor integrated into the display device 101.

At 2346, the clearance level can be further analyzed. The clearance level can be analyzed to determine if an intermediate clearance level was received. For example, the clearance level can be analyzed by a processor integrated into the display device 101. In an example, at 2355, a viewing device can be controlled in response to receiving a highest clearance level. Controlling a viewing device in response to receiving a highest clearance level can correspond to controlling a viewing device using a synchronization parameter associated with a highest clearance level.

At 2356, a viewing device can be controlled in response to receiving an intermediate clearance level. In an example, controlling a viewing device in response to receiving an intermediate clearance level can correspond to controlling a viewing device using a synchronization parameter associated with an intermediate clearance level.

At 2357, a viewing device can be controlled in response to receiving a clearance level that is neither a highest clearance level nor an intermediate clearance level. In an example, controlling a viewing device in response to receiving such a clearance level can correspond to controlling a viewing device using a synchronization parameter associated with a lowest clearance level.

At 2375, a private image can be ascertained. The private image can be ascertained using the viewing device 102, such as controlled at 2355, to view the private image displayed at 2320. At 2376, first and second portions of the private image can be ascertained. The viewing device 102, such as controlled at 2356, can be used to ascertain the first and second portions of the private image displayed at 2320.

At 2377, at least the first portion of the private image can be ascertained. The viewing device 102, controlled at 2357, can be used to ascertain the first portion of the private image displayed at 2320.

Figure 24:
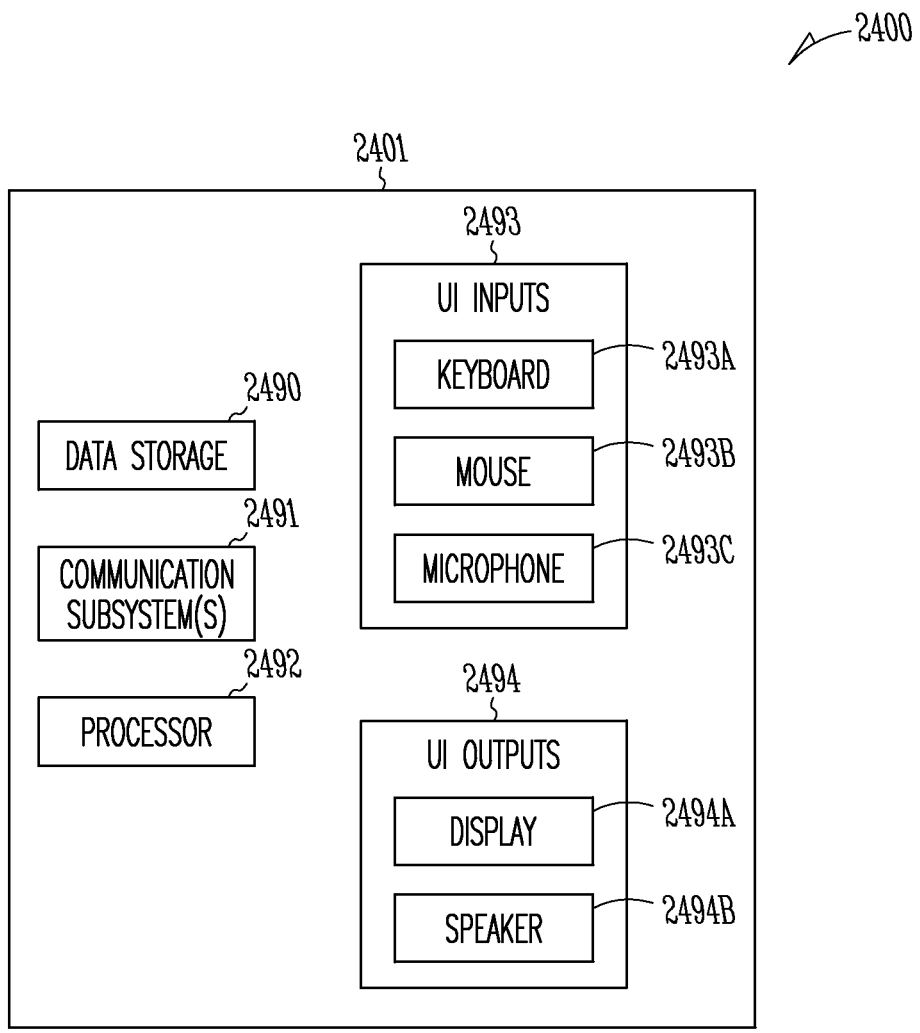
FIG. 24 illustrates generally an example of a portion of a system that can include a mobile device, including user interface inputs, and user interface outputs, according to one embodiment.

FIG. 24 illustrates generally an example of a portion of a system that can include a mobile device, including user interface inputs, and user interface outputs. In the example of FIG. 24, a system 2400 can include a display device 2401. The display device 2401 can include a data storage circuit 2490, a communication subsystem(s) circuit 2491, a processor circuit 2492, user interface inputs 2493, and user interface outputs 2494.

In an example, the display device 2401 can include the mobile device 201, such as configured to display information using the display 205 using AFS. The data storage circuit 2490 can include volatile or non-volatile computer memory, such as RAM or hard disk memory. The communication subsystem(s) circuit 2491 can include, among other things, a wireless networking transmitter or receiver, a cellular networking transmitter or receiver, or a wired communication device.

In an example, the processor circuit 2492 can be configured to receive information from, among other things, one or more of the data storage circuit 2490, the communication subsystem(s) 2491, or the user interface inputs 2493. The processor circuit 2492 can be configured to provide information to, among other things, one or more of the data storage circuit 2490, the communication subsystem(s) 2491, or the user interface outputs 2494.

In an example, the user interface inputs 2493 can include a keyboard 2493A, a mouse 2493B, or a microphone 2493C. The user interface outputs 2494 can include a display 2494A, or a speaker 2494B.

Figure 25:
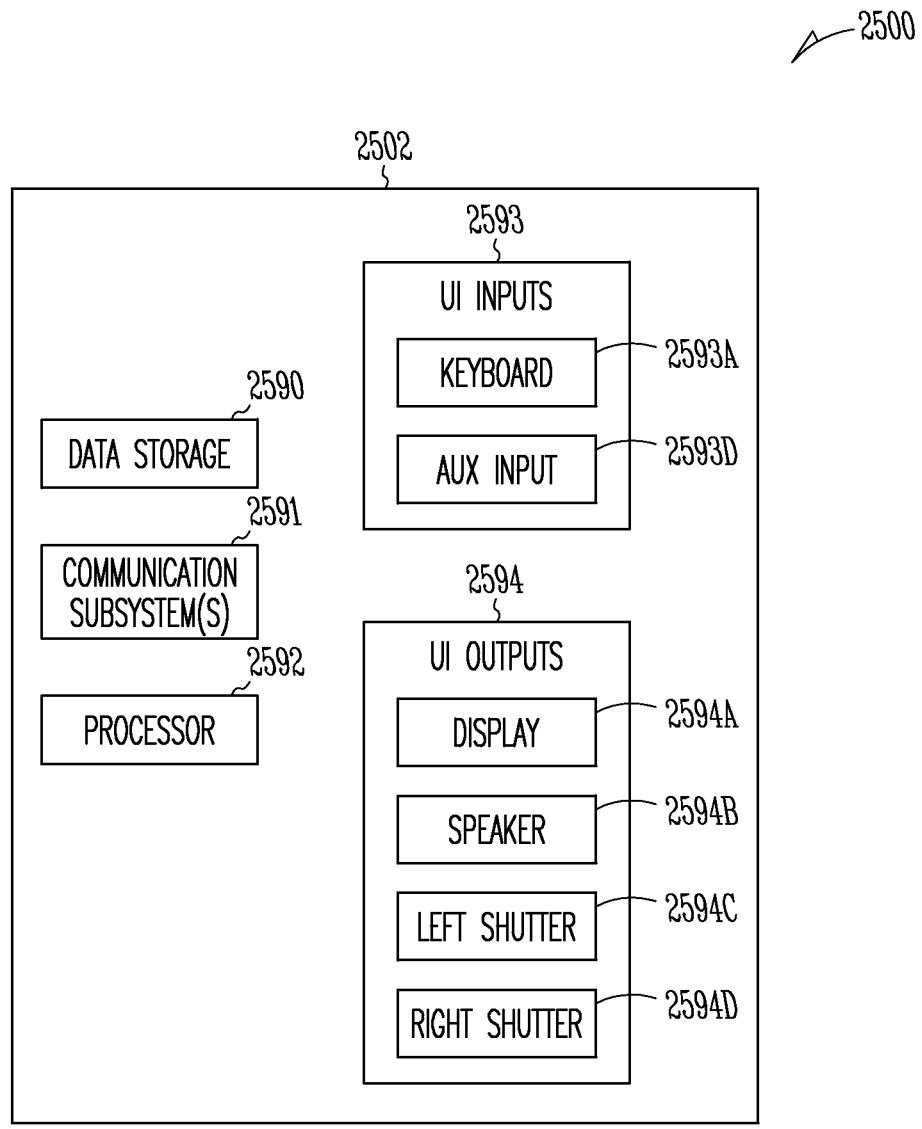
FIG. 25 illustrates generally an example of a portion of a system that can include a viewing device, including user interface inputs, and user interface outputs, according to one embodiment.

FIG. 25 illustrates generally an example of a portion of a system that can include a viewing device, including user interface inputs, and user interface outputs. In the example of FIG. 25, a system 2500 can include a viewing device 2502. The viewing device 2502 can include a data storage circuit 2590, a communication subsystem(s) circuit 2591, a processor circuit 2592, user interface inputs 2593, and user interface outputs 2594.

In an example, the viewing device 2502 can include the viewing device 201, such as can be configured to enable a user of the viewing device 201 to ascertain information displayed using AFS. For example, the data storage circuit 2590 can include volatile or non-volatile computer memory, such as RAM or hard disk memory, configured to store information about one or more frame display sequences. The communication subsystem(s) circuit 2591 can include, among other things, a wireless networking transmitter or receiver, a cellular networking transmitter or receiver, or a wired communication device. The communication subsystem(s) circuit 2591 can be configured to receive or transmit one or more AFS synchronization parameters, such as to the display device 2401.

In an example, the processor circuit 2592 can be configured to receive information from, among other things, one or more of the data storage circuit 2590, the communication subsystem(s) 2591, or the user interface inputs 2593. The processor circuit 2592 can be configured to provide information to, among other things, one or more of the data storage circuit 2590, the communication subsystem(s) 2591, or the user interface outputs 2594.

In an example, the user interface inputs 2593 can include a keyboard 2593A, or auxiliary inputs 2593D. For example, an auxiliary input 2593D can include an infrared communications circuit. The user interface outputs 2594 can include a display 2594A, a speaker 2594B, a left shutter 2594C, or a right shutter 2594D. In an example, the viewing device 102 can include one or more of the left shutter 2594C or the right shutter 2594D. The shutters can be operated to permit an authorized user of the viewing device 2502 to view confidential information displayed using AFS, such as on the display device 2401. In an example, the shutters can be operated according to the discussion of FIGS. 15, 16, 17, and 18.

EXAMPLES

Example 1 includes subject matter (such as a method, a means for performing acts, or a machine-readable medium including instructions that, when performed by the machine, cause the machine to perform acts) that can include displaying a user interface on a display, the user interface comprising a first region and a second region, and displaying, in the first region, a private image using alternate frame sequencing, the private image ascertainable only through a viewing device synchronized to the display. Example 1 can include displaying, in the second region, a public image, the public image ascertainable without the viewing device, and controlling the viewing device, such as using a processor, to enable a user of the viewing device to ascertain the private image and the public image.

In Example 2, the subject matter of Example 1 can optionally include displaying user interface information, such as on a handheld mobile device. In Example 2, a public image can include the user interface information.

In Example 3, the subject matter of one or any combination of Examples 1-2 can optionally include controlling the viewing device, including independently controlling two monocular viewing lenses configured for binocular use.

In Example 4, the subject matter of one or any combination of Examples 1-3 can optionally include receiving an encrypted message that can include a synchronization parameter, the encrypted message decipherable using a rotating decryption key, and the synchronization parameter enabling synchronization of a viewing device and a display device.

In Example 5, the subject matter of one or any combination of Examples 1-4 can optionally include, in the first region, an active display region, such as any region of the display device with which a user is actively engaged.

Example 6 includes subject matter that can include a computer-readable medium having computer-executable instructions for executing a method, and the method can comprise displaying a private image on a display using alternate frame sequencing, authenticating a viewing device and the display to synchronize the viewing device and the display, wherein the authenticating can enable a user of the viewing device to ascertain the private image for a first authentication period. Example 6 can include re-authenticating the viewing device and the display, the re-authenticating enabling the user of the viewing device to ascertain the private image for a subsequent authentication period.

In Example 7, the subject matter of Example 6 can optionally include receiving an encrypted message that can include a synchronization parameter, the synchronization parameter including a frame display duration parameter. In an example, at least one of the authenticating or the re-authenticating can include receiving the encrypted message.

In Example 8, the subject matter of one or any combination of Examples 6-7 can optionally include receiving an encrypted message that can include a synchronization parameter, the synchronization parameter including, among other things, a frame sequence count or a pseudo-random sequence.

In Example 9, the subject matter of one or any combination of Examples 6-8 can optionally include receiving an encrypted message that can include a synchronization parameter, the synchronization parameter including a pseudo-random sequence.

In Example 10, the subject matter of one or any combination of Examples 6-9 can optionally include authenticating or re-authenticating using a dynamic decryption key.

In Example 11, the subject matter of one or any combination of Examples 6-10 can optionally include using a dynamic encryption key, including using a first decryption key at a first time, and using a second decryption key at a second time.

In Example 12, the subject matter of one or any combination of Examples 6-11 can optionally include using a dynamic encryption key, including using a first decryption key for a first frame sequence count, and using a second decryption key for a second frame sequence count.

In Example 13, the subject matter of one or any combination of Examples 6-12 can optionally include authenticating or re-authenticating, including receiving a message encrypted using public-key cryptography.

Example 14 includes subject matter (such as a system, a method, a means for performing acts, or a machine-readable medium including instructions that, when performed by the machine, cause the machine to perform acts) that can include a display device, a processor circuit, including a first data input configured to receive information about an environment parameter, and a data output configured to provide display information (i.e., to supply information of any kind in any format to be displayed) to the display device. Example 14 can optionally include a processor-readable medium, including instructions that, when performed by the processor circuit, configure the system to determine if the received information about the environment parameter indicates a secure environment, determine if the received information about the environment parameter indicates an unsecure environment, and provide the display information using the data output. Providing the display information using the data output can optionally include providing the display information without using alternate frame sequencing if the received information about the environment parameter indicates a secure environment, or providing the display information using alternate frame sequencing if the received information about the environment parameter indicates an unsecure environment.

In Example 15, the subject matter of Example 14 can optionally include a processor-readable medium, including instructions that, when performed by the processor circuit, configure the system to determine if the received information about the environment parameter indicates an intermediately secure environment, and provide, using the data output, at least a portion of the display information using alternate frame sequencing if the received information about the environment parameter indicates an intermediately secure environment.

In Example 16, the subject matter of one or any combination of Examples 14-15 can optionally include using at least one sensor to receive information indicative of an environment parameter.

In Example 17, the subject matter of one or any combination of Examples 14-16 can optionally include a sensor, wherein the sensor can be at least one of a camera, a GPS receiver, a receiver in a cellular telephone network, a microphone, an accelerometer, a thermometer, or a receiver in a wireless device, among other things. \

In Example 18, the subject matter of one or any combination of Examples 14-17 can optionally include data indicative of an environment parameter including a service set identifier.

Example 19 includes subject matter that can include a computer-readable medium having computer-executable instructions for executing a method, the method comprising, displaying a private image using alternate frame sequencing, and controlling at least a first viewing device and a second viewing device, the first viewing device configured to enable a user of the first viewing device to ascertain the private image, and the second viewing device configured to preclude a user of the second viewing device from ascertaining at least a portion of the private image.

In Example 20, the subject matter of Example 19 can optionally include receiving a clearance level, and controlling at least a first viewing device and a second viewing device using the clearance level.

In Example 21, the subject matter of one or any combination of Examples 19-20 can optionally include identifying, for the user of a first viewing device, at least a portion of a private image, such as using a visual indication.

In Example 22, the subject matter of one or any combination of Examples 19-21 can optionally include identifying, for the user of a first viewing device, a portion of the private image that is not ascertainable by a user of a second viewing device, such as using a visual indication.

In Example 23, the subject matter of one or any combination of Examples 19-22 can optionally include displaying a second private image using alternate frame sequencing, and, using the second private image, identifying, for a user of a first viewing device, a portion of the private image that is not ascertainable by a user of a second viewing device, such as using a visual indication.

Example 1 includes subject matter (such as a method, a means for performing acts, or a machine-readable medium including instructions that, when performed by the machine, cause the machine to perform acts) that can include displaying a private image using alternate frame sequencing, receiving a clearance level, and, if a highest clearance level is received, controlling a viewing device, using a processor, to enable a user of the viewing device to ascertain the private image. In Example 24, if an intermediate clearance level is received, the viewing device can be controlled, such as using a processor, to enable a user of the viewing device to ascertain at least a first portion of the private image and a second portion of the private image. If a lowest clearance level is received, the viewing device can be controlled, such as using a processor, to enable a user of the viewing device to ascertain at least the first portion of the private image.

These examples can be combined in any permutation or combination.

ADDITIONAL NOTES

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. Further, the concepts described herein are not strictly limited to protection of confidential or sensitive information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The claimed invention is:

1. A method, comprising:
   receiving information about an environment parameter;
   displaying a user interface on a display having a display area, the user interface comprising a first region and a different second region corresponding to first and different second regions of the display area;
   displaying, in the first region of the display area, a private image using alternate frame sequencing when the received information about the environment parameter indicates an unsecure environment, the private image ascertainable only through a viewing device synchronized to the display;
   displaying, in the different second region of the display area, a public image, the public image ascertainable without the viewing device and the public image including device navigation or device status information;
   authenticating the viewing device and the display to synchronize the viewing device and the display, the authenticating enabling a user of the viewing device to ascertain the private image for a first authentication period, and the authenticating corresponding to a first frame display duration or a first frame display sequence for displaying the private image; and
   re-authenticating the viewing device and the display, the re-authenticating enabling the user of the viewing device to ascertain the private image for a subsequent authentication period, and the re-authenticating corresponding to a second frame display duration or a second frame display sequence for displaying the private image; and
   wherein the re-authenticating the viewing device includes using a secret number, an increment number, and a duration period to determine the second frame display duration or to determine the second frame display sequence for displaying the private image.

2. The method of claim 1, wherein the controlling the viewing device includes independently controlling two monocular viewing lenses configured for binocular use such that one of the lenses is opaque when the other of the lenses is transparent.

3. The method of claim 1, further comprising receiving an encrypted message that includes a synchronization parameter, the encrypted message decipherable using a rotating decryption key, and the synchronization parameter enabling synchronization of the viewing device and the display.

4. The method of claim 1, wherein the first region includes an active display region with which the user is engaged.

5. The method of claim 1, wherein at least one of the authenticating or the re-authenticating includes receiving an encrypted message that includes a synchronization parameter, the synchronization parameter including a frame display duration parameter.

6. The method of claim 1, wherein at least one of the authenticating or the re-authenticating includes receiving an encrypted message that includes a synchronization parameter, the synchronization parameter including a frame sequence count.

7. The method of claim 1, wherein at least one of the authenticating or the re-authenticating includes receiving an encrypted message that includes a synchronization parameter, the synchronization parameter including a pseudo-random sequence.

8. The method of claim 1, wherein at least one of the authenticating or the re-authenticating includes using a dynamic decryption key.

9. The method of claim 8, wherein using the dynamic decryption key includes using a first decryption key at a first time, and using a second decryption key at a second time.

10. The method of claim 8, wherein using the dynamic decryption key includes using a first decryption key for a first frame sequence count, and using a second decryption key for a second frame sequence count.

11. The method of claim 1, wherein at least one of the authenticating or the re-authenticating includes receiving a message encrypted using public-key cryptography.

12. A method comprising:
   receiving information about an environment parameter;
   determining if the received information about the environment parameter indicates a secure environment;
   determining if the received information about the environment parameter indicates an unsecure environment;
   providing display information to a display device, including:
   providing the display information without using alternate frame sequencing if the received information about the environment parameter indicates a secure environment; and
   providing the display information using alternate frame sequencing if the received information about the environment parameter indicates an unsecure environment, the display information including:
   a user interface comprising a first region and a different second region, the first region comprising a private image displayed using alternate frame sequencing and ascertainable only through a viewing device when the viewing device is synchronized to the display device, and the second region comprising a public image ascertainable without the viewing device, the public image including device navigation or device status information;

controlling the viewing device, including:
authenticating the viewing device and the display device to synchronize the viewing device and the display device, the authenticating enabling a user of the viewing device to ascertain the private image for a first authentication period, and the authenticating corresponding to a first frame display duration or a first frame display sequence for displaying the private image; and
re-authenticating the viewing device and the display device, the re-authenticating enabling the user of the viewing device to ascertain the private image for a subsequent authentication period, and the re-authenticating corresponding to a second frame display duration or a second frame display sequence for displaying the private image;
wherein the re-authenticating the viewing device includes using a secret number, an increment number, and a duration period to determine the second frame display duration or to determine the second frame display sequence for displaying the private image; and
wherein the providing the display information using alternate frame sequencing includes visually identifying for the user a portion of the private image that is ascertainable only with the viewing device.

13. The method of claim 12, comprising:
determining if the received information about the environment parameter indicates an intermediately secure environment; and
providing at least a portion of the display information using alternate frame sequencing if the received information about the environment parameter indicates an intermediately secure environment.

14. The method of claim 12, wherein the receiving information about the environment parameter includes receiving information from at least one environment sensor.

15. The method of claim 14, wherein the at least one sensor is a camera.

16. The method of claim 14, wherein the at least one sensor is a GPS receiver.

17. The method of claim 14, wherein the at least one sensor is a receiver in a cellular telephone network.

18. The method of claim 14, wherein the at least one sensor is a microphone.

19. The method of claim 14, wherein the at least one sensor is an accelerometer.

20. The method of claim 14, wherein the at least one sensor is a thermometer.

21. The method of claim 14, wherein the at least one sensor is a receiver in a wireless device.

22. The method of claim 21, wherein the information about the environment parameter includes a service set identifier.

23. A non-transitory tangible computer-readable medium having computer-executable instructions for executing a method, the method comprising:
receiving information about an environment parameter;
displaying a user interface on a display having a display area, the user interface comprising a first region and a different second region corresponding to first and different second regions of the display area;
displaying, in the first region of the display area, a private image using alternate frame sequencing when the received information about the environment parameter indicates an unsecure environment, the private image ascertainable only through a viewing device synchronized to the display;
displaying, in the different second region of the display area, a public image, the public image ascertainable without the viewing device and the public image including device navigation or device status information;
authenticating the viewing device and the display to synchronize the viewing device and the display, the authenticating enabling a user of the viewing device to ascertain the private image for a first authentication period, and the authenticating corresponding to a first frame display duration or a first frame display sequence for displaying the private image; and
re-authenticating the viewing device and the display, the re-authenticating enabling the user of the viewing device to ascertain the private image for a subsequent authentication period, and the re-authenticating corresponding to a second frame display duration or a second frame display sequence for displaying the private image; and
wherein the re-authenticating the viewing device includes using a secret number, an increment number, and a duration period to determine the second frame display duration or to determine the second frame display sequence for displaying the private image.

24. The non-transitory tangible computer-readable medium of claim 23, wherein the method further comprises controlling a different second viewing device to enable a user of the different second viewing device to ascertain a first portion of the private image and to preclude the user of the different second viewing device from ascertaining at least a second portion of the private image that is ascertainable to the user of the first viewing device.

25. The non-transitory tangible computer-readable medium of claim 24, wherein the method further comprises receiving a clearance level, and wherein the controlling one of the first and different second viewing devices includes using the clearance level.

26. The non-transitory tangible computer-readable medium of claim 24, wherein the method further comprises visually identifying, for the user of the first viewing device, the second portion of the private image that is ascertainable by the user of the first viewing device and that is not ascertainable by the user of the different second viewing device.

27. A system comprising:
an environment sensor configured to receive information about an environment parameter;
a display device having a display area;
a viewing device;
a display processor circuit, coupled to the display device, configured to:
display a user interface on the display area of the display device, the user interface comprising a first region and a different second region corresponding to first and different second regions of the display area;
display, in the first region of the display area, a private image using alternate frame sequencing when the information about the environment parameter from the environment sensor indicates an unsecure environment, the private image ascertainable only through a viewing device synchronized to the display; and
display, in the different second region of the display area, a public image, the public image ascertainable without the viewing device and the public image including device navigation or device status information; and
a viewing device processor circuit, coupled to the viewing device, the viewing device processor circuit configured to:
authenticate the viewing device and the display device to synchronize the viewing device and the display device and enable a user of the viewing device to ascertain the private image for a first authentication period, and the authenticating corresponding to a first frame display duration or a first frame display sequence for displaying the private image; and re-authenticate the viewing device and the display device to enable the user of the viewing device to ascertain the private image for a subsequent authentication period, and the re-authenticating corresponding to a second frame display duration or a second frame display sequence for displaying the private image; and wherein the re-authenticating the viewing device includes using a secret number, an increment number, and a duration period to determine the second frame display duration or to determine the second frame display sequence for displaying the private image.

* * * * *